United States Patent [19]

Ise

[11] Patent Number: 5,418,551

[45] Date of Patent: * May 23, 1995

[54] TABLET INTEGRATED WITH DISPLAY

[75] Inventor: Masahiro Ise, Kashihara, Japan

[73] Assignee: Sharp Kabushiki Kaisha, Osaka, Japan

[*] Notice: The portion of the term of this patent subsequent to Feb. 1, 2011 has been disclaimed.

[21] Appl. No.: 89,776

[22] Filed: Jul. 12, 1993

Related U.S. Application Data

[63] Continuation of Ser. No. 452,243, Dec. 18, 1989, Pat. No. 5,283,556.

[30] Foreign Application Priority Data

| Dec. 19, 1988 | [JP] | Japan | 63-320150 |
| Dec. 24, 1988 | [JP] | Japan | 63-326738 |
| Dec. 24, 1988 | [JP] | Japan | 63-326739 |
| Dec. 24, 1988 | [JP] | Japan | 63-326740 |
| Jun. 26, 1989 | [JP] | Japan | 1-163221 |

[51] Int. Cl.[6] .................................. G09G 3/02
[52] U.S. Cl. ............................. 345/174; 178/19
[58] Field of Search ............... 345/173, 174, 175, 176, 345/177, 180, 181, 182, 183; 178/18, 19; 341/5, 33

[56] References Cited

U.S. PATENT DOCUMENTS

| 3,958,234 | 5/1976 | Hoo . |
| 3,975,592 | 8/1976 | Carvey . |
| 3,992,579 | 11/1976 | Dym et al. . |
| 4,022,971 | 5/1977 | Rodgers . |
| 4,117,471 | 9/1978 | Schlig et al. . |
| 4,492,818 | 1/1985 | Abe . |
| 4,507,523 | 3/1985 | Gohara et al. . |
| 4,568,799 | 2/1986 | Kabayashi et al. . |
| 4,717,793 | 1/1988 | Kobayashi . |
| 4,788,386 | 11/1988 | Matthews et al. . |
| 4,794,634 | 12/1988 | Torihata et al. . |
| 4,837,566 | 6/1989 | Channing et al. . |
| 4,839,634 | 6/1989 | More et al. . |
| 4,841,290 | 6/1989 | Nakano et al. . |
| 4,992,630 | 2/1991 | Mletzko . |
| 5,159,323 | 10/1992 | Mase et al. ........................ 345/173 |
| 5,283,556 | 2/1994 | Ise ...................................... 345/174 |

OTHER PUBLICATIONS

IEEE Communications Magazine, Jul. 1986, vol. 24, No. 7, pp. 18-23.

Primary Examiner—Ulysses Weldon
Assistant Examiner—Regina Liang
Attorney, Agent, or Firm—Sandler Greenblum & Bernstein

[57] ABSTRACT

A tablet integrated with a display is provided comprising a matrix panel having row and column electrodes, a detecting conductor, a row electrode driver, a column electrode driver, and row and column coordinate detecting circuits. In a display mode, the row electrode driver applies a row scanning pulse successively to each row electrode of the matrix panel, and the column electrode driver simultaneously applies a display voltage to each column electrode of the matrix panel each time a corresponding row scanning pulse is applied. In a row detection mode, the row electrode driver applies the row scanning pulse successively to each row electrode of the matrix panel, and analyzes the timing of the row scanning pulse detected by a detecting conductor touching the matrix panel, so as to determine the row coordinate of the position of the detecting conductor. In a column detection mode, the column electrode driver applies the column scanning pulse successively to each column electrode of the matrix panel, and the column coordinate detecting circuit analyzes the timing of the column scanning pulse detected by the detecting conductor touching the matrix panel, so as to determine the column coordinate of the detecting conductor.

20 Claims, 15 Drawing Sheets

TABLET INTEGRATED WITH DISPLAY

This application is a continuation of application Ser. No. 07/452,243, filed Dec. 18, 1989, now U.S. Pat. No. 5,283,556.

BACKGROUND OF THE INVENTION

1. Field of the Invention

The present invention relates to a tablet integrated with a display in which a tablet for inputting coordinates and a display are assembled into a unity.

2. Prior Art of the Invention

Conventionally, a tablet integrated with a display is manufactured by making a display 51 and a tablet 52 individually and attaching them to each other into a unity, as shown in FIG. 18. The display 51 may be an electroluminescent (EL) display device, and the tablet 52 may be a electrostatic capacitive coupling device. In FIG. 18, reference numeral 53 denotes a pen used for detecting a scanning pulse.

With the above constitution, a display screen of the display 51 and an input screen of the tablet 52 must be conformed in all parts with an accuracy of a single display pixel, and it is difficult to satisfy the requirement in manufacturing.

If the display 51 is an EL display device and the tablet 52 is a electrostatic capacitive coupling device, both of the display 51 and the tablet 52 have electrodes disposed in a matrix and both of them include a driver having the same function. Consequently, the circuit becomes expensive due to wasteful use of space on the circuit.

SUMMARY OF THE INVENTION

The present invention provides a tablet integrated with a display comprising a matrix panel for display, having row and column electrodes; a detecting conductor which can be coupled capacitively with the row and column electrodes when touched on the matrix panel; a row electrode driver for applying a row scanning pulse successively to every row electrode of the matrix panel; a column electrode driver for applying a column scanning pulse successively to every column electrode of the matrix panel and applying voltage corresponding to display data for a specific period of time; a timing generator for transferring the display data to the column electrode driver and applying timing signals for determining timings of the row and column scanning pulses to the row electrode driver and the column electrode driver; a row coordinate detecting circuit electrically connected to the detecting conductor, for detecting a row coordinate; and a column coordinate detecting circuit electrically connected to the detecting conductor, for detecting a column coordinate. In the display mode, the row electrode driver applies the row scanning pulse successively to every row electrode of the matrix panel from one to another, and the column electrode driver applies voltage in accordance with the display data simultaneously to the column electrode of the matrix panel each time the row scanning pulse is applied successively to the row electrode of the matrix panel. In the row detection mode, the row electrode driver applies the row scanning pulse successively to the row electrode of the matrix panel, and receives the row scanning pulse detected through electrostatic capacitive coupling caused by the detecting conductor touching an arbitrary position on the matrix panel, so as to present the row coordinate of the position which the detecting conductor touches in the column detection mode, the column electrode driver applies the column scanning pulse successively to the column electrode of the matrix panel, and the column coordinate detecting circuit receives the column scanning pulse detected through electrostatic capacitive coupling caused by the detecting conductor touching an arbitrary position on the matrix panel, so as to present the column coordinate of the position which the detecting conductor touches.

Accordingly, the present invention can provide a tablet integrated with a display which can be manufactured easily with reduced cost.

DETAILED DESCRIPTION OF THE PREFERRED EMBODIMENTS

Now, an embodiment according to the present invention will be described with reference to FIG. 1. A matrix panel employed in this embodiment is a thin film electroluminescent (EL) matrix panel.

Figure 1:
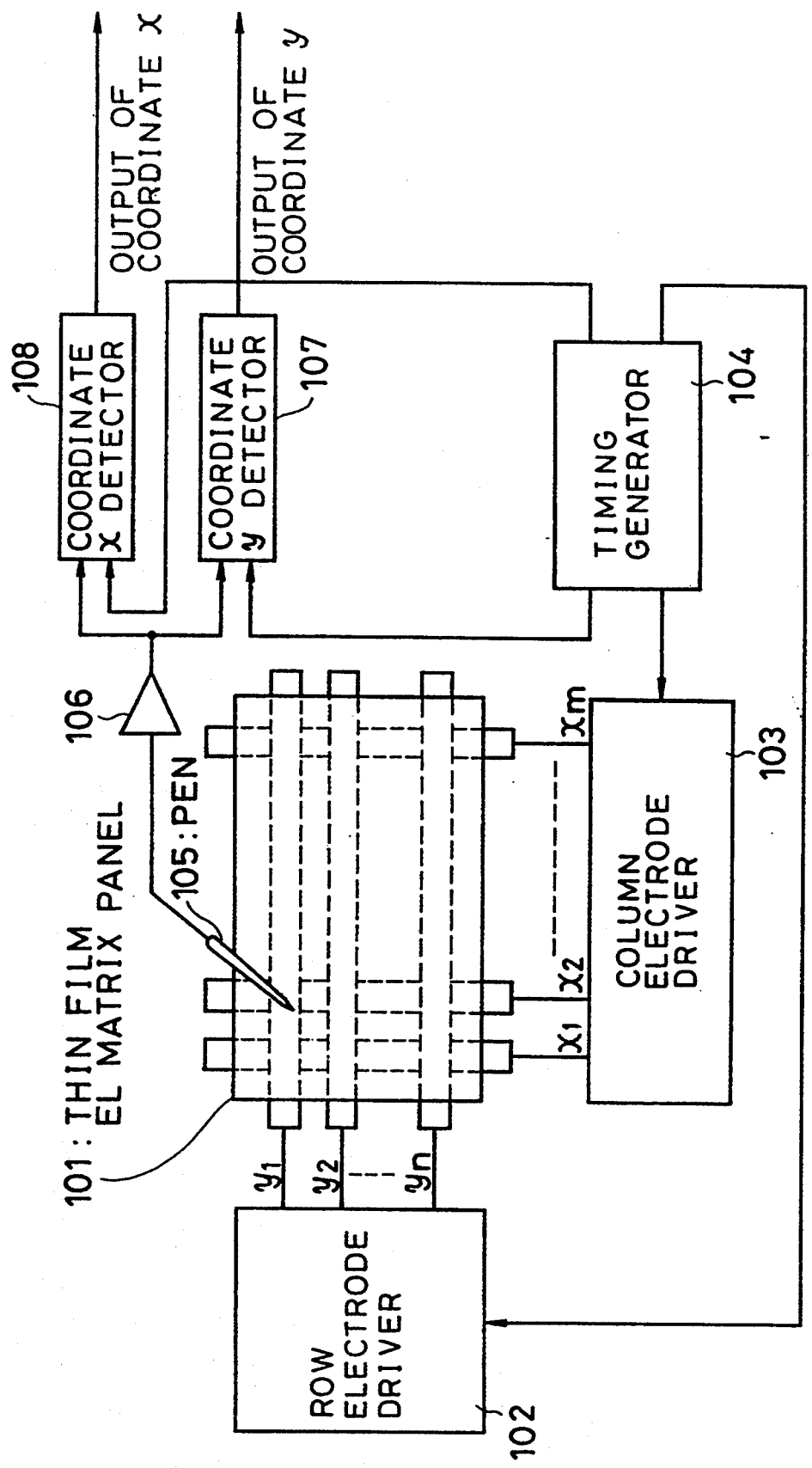
FIG. 1 is a diagram showing a constitution of an embodiment of the present invention.

In FIG. 1, a thin film EL matrix panel 101 includes row electrodes $y_1, y_2, \ldots, y_n$ and column electrodes $x_1, x_2, \ldots, x_m$. A row electrode driver 102 has a plurality of output terminals connected to the row electrodes $y_1, y_2$, and driver 103 has a plurality of output terminals connected to the column electrodes $x_1, x_2, \ldots, x_m$ of the panel 101, respectively.

Figure 2:
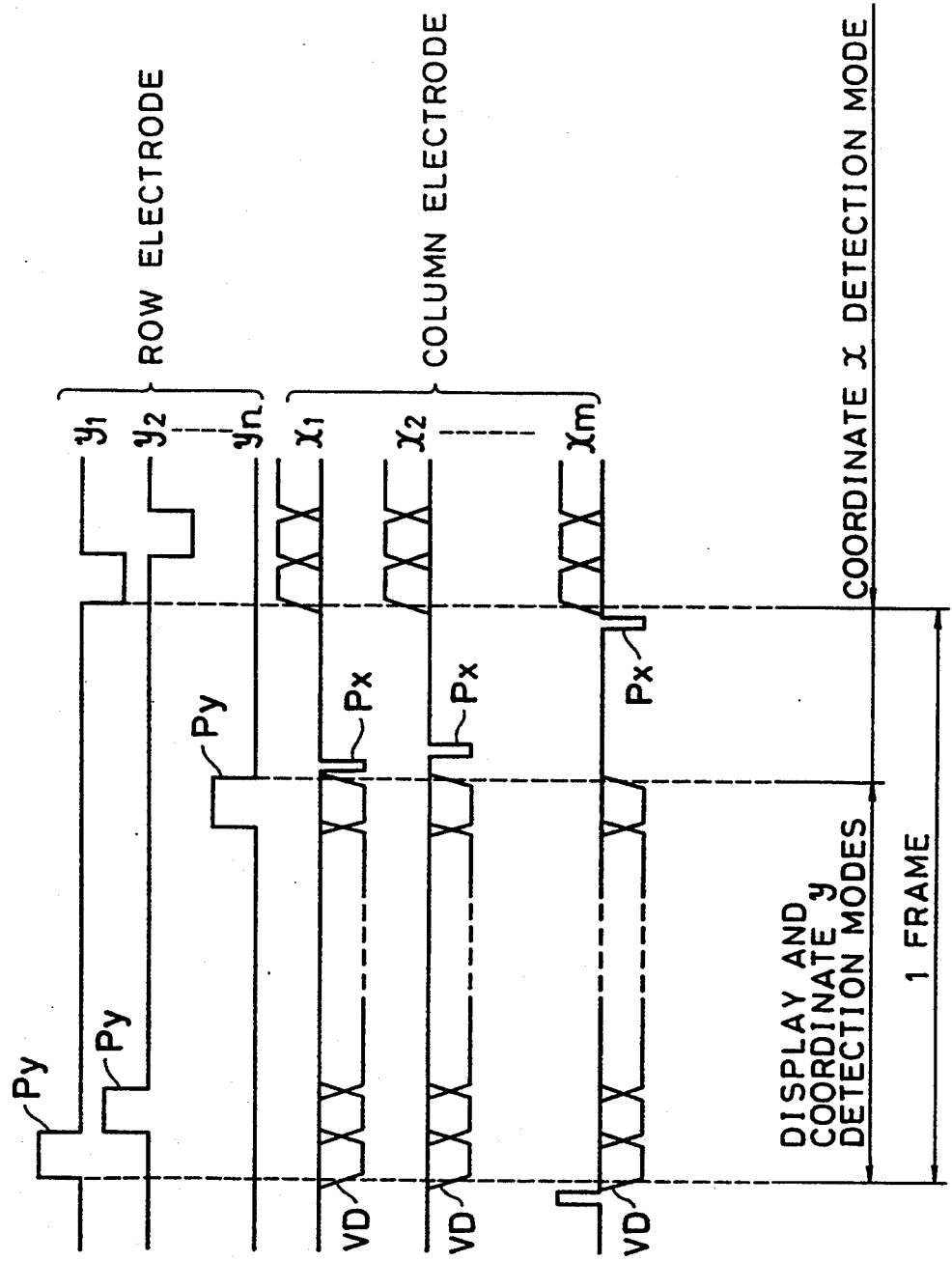
FIG. 2 is a diagram presented for explaining the operation of the embodiment in FIG. 1.

The operation of each of the row electrode driver 102 and the column electrode driver 103 is controlled by a timing generator 104 which generates various timing signals described hereinafter based upon data stored in a ROM. As shown in FIG. 2, in the display mode and the row (y) coordinate detection mode, a scanning pulse Py is supplied to the row electrodes $y_1, y_2, \ldots, y_n$ successively from one to another from the row electrode driver 102. At this time, a voltage VD in accordance with display data SD is applied to the column electrodes $x_1, x_2, \ldots, x_m$ synchronously every scanning line from the column electrode driver 103. In the column (x) coordinate detection mode, a scanning pulse Px is supplied to the column electrodes $x_1, x_2, \ldots, x_m$ successively from one to another from the column electrode driver 103.

As a result, the display mode and the row coordinate detection mode progress with the same drive state; namely, the display mode, progresses simultaneously with the row coordinate detection mode. As shown in FIG. 2, every frame is divided into the period of the display mode (row coordinate detection mode) and the period of the column coordinate detection mode in timesharing.

Polarity of each of the scanning pulses Py, Px is inverted every frame. For example, ±190 V are selectively applied to the row electrodes y1, y2, . . . , yn, and ±30 V are selectively applied to the column electrodes x1, x2, . . . , xm. If EL light emitting threshold voltage is ±200 V, ±220 V are applied to a light emitting pixel portion with polarity alternately inverted.

Under this condition, the scanning pulse Py is supplied to the row electrodes y1, y2, . . . , yn successively every electrode in the display mode, while the voltage VD is applied to the column electrodes x1, x2, . . . , xm synchronously every scanning line corresponding to the display data SD. The display operation is carried out by scanning every line successively, so that an image corresponding to the display data SD is displayed.

Touching a pencil-shaped conductor (referred to as "pen" hereinafter) on an arbitrary position on the panel 101, a scanning pulse is detected through electrostatic capacitive coupling. The scanning pulse detected with the pen 105 is supplied to a coordinate y detecting circuit (detector) 107 and a coordinate x detecting circuit (detector) 108 through an amplifier 106.

In this case, the coordinate y detecting circuit 107 may include a counter, for example. The timing generator 104 applies a reset signal to the coordinate y detecting circuit 107 to reset it before the timing generator 104 applies a clock to the coordinate y detecting circuit 107. At a timing of applying the scanning pulse Py to the row electrodes y1, y2, . . . , yn of the panel 101 successively, the coordinate y detecting circuit 107 receives a clock and counts it. This count operation is stopped when the pen 105 detects the scanning pulse Py. In this way, the coordinate y detecting circuit 107 outputs a count value corresponding to the position which the pen 105 touches on the panel 101 so as to present the row coordinate.

The coordinate x detecting circuit 108 may also include a counter, for example. The timing generator 104 applies a reset signal to the coordinate x detecting circuit 108 to reset it before the timing generator 104 applies a clock to the coordinate x detecting circuit 108. At a timing of applying the scanning pulse Px to the column electrodes x1, x2, . . . , xm of the panel 101 successively, the coordinate x detecting circuit 108 receives a clock and counts it. This count operation is stopped when the pen 105 detects the scanning pulse Px. In this way, the coordinate x detecting circuit 108 outputs a count value corresponding to the position which the pen 105 touches on the panel 101 so as to present the column coordinate.

Figure 3:
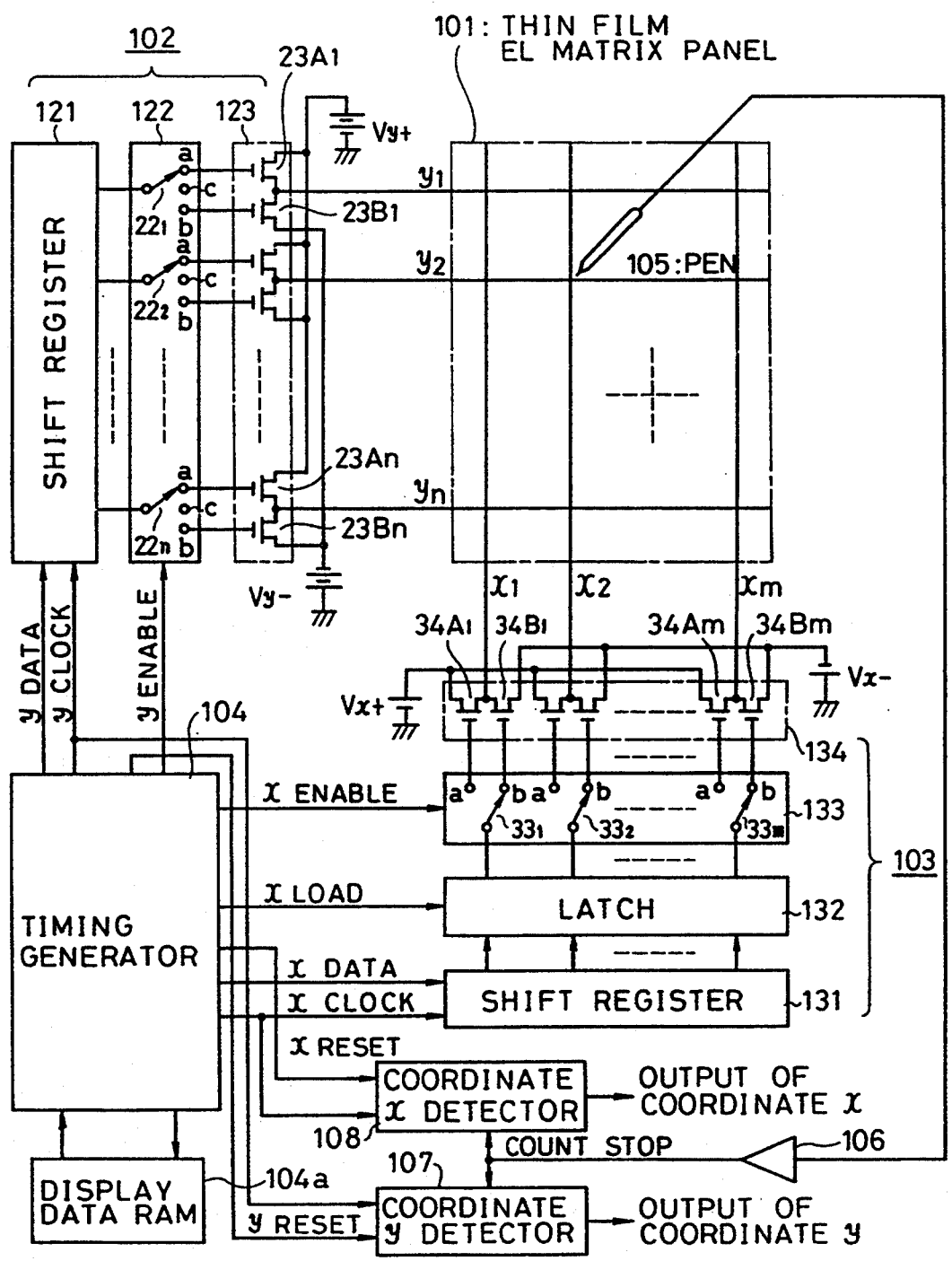
FIG. 3 is a diagram showing in detail a system constitution of the embodiment in FIG. 1.

FIG. 3 is a diagram showing a constitution of the example shown in FIG. 1 in detail. Like reference numerals denote corresponding parts in FIGS. 1 and 3.

In FIG. 3, a shift register 121 includes stages by the number corresponding to the number of the row electrodes y1, y2, . . . , yn of the panel 101. A switch circuit 122 includes switches $22_1$ to $22_n$ by the number corresponding to the number of the row electrodes. A gate circuit 123 includes N channel FETs 23A1 to 23An and N channel FETs 23B1 to 23Bn by the number corresponding to the number of the row electrodes, respectively. The row electrode driver 102 is composed of the shift register 121, switch circuit 122 and gate circuit 123.

Each of output terminals of n stages of the shift register 121 is connected to a movable terminal of each of the switches $22_1$ to $22_n$ of the switch circuit 122, respectively. A fixed terminal on the a-side of each of the switches $22_1$ to $22_n$ is connected to a gate of each of the N channel FETs 23A1 to 23An of the gate circuit 123, a fixed terminal on the b-side of each of the switches $22_1$ to $22_n$ is connected to a gate of each of the N channel FETs 23B1 to 23Bn, and a fixed terminal on the c-side is not electrically connected to any circuit. Each of the N channel FETs 23A1 to 23An has its drain connected to a power supply Vy+ (+190 V), while each of the N channel FETs 23B1 to 23Bn has its source connected to a power supply Vy− (−190 V). Each of the N cannel FETs 23A1 to 23An has its source connected to a drain of each of the N channel FETs 23B1 to 23Bn, and junctions of these FETs are connected to the row electrodes y1, y2, . . . , yn of the panel 101.

Figure 4:
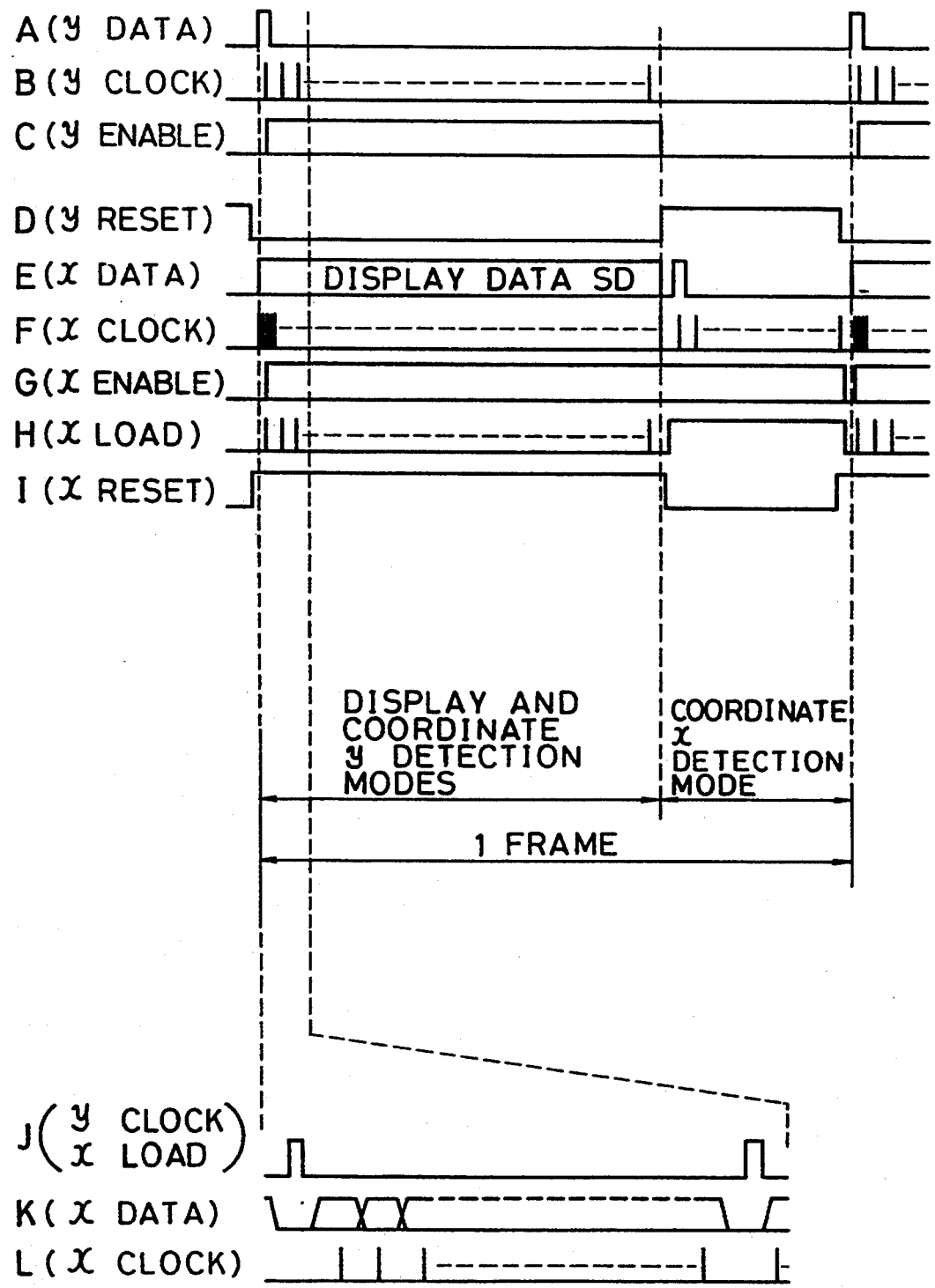
FIG. 4 is a diagram presented for explaining the operation of the system constitution in FIG. 3.

In this case, in the display mode and row coordinate detection mode, the timing generator 104 applies an enable signal of 2 bit data, for example, to the switch circuit 122 of an analog switch, for example (y enable as C in FIG. 4). When the enable signal is "1, 0", the switches $22_1$ to $22_n$ are connected to the a-side every frame. When the enable signal is "1, 1", they are connected to the b-side every frame. The timing generator 104 applies data (y data as A in FIG. 4) for the scanning pulse Py to the shift register 121 and also applies a clock (y clock as B and J in FIG. 4) to the shift register 121.

Thus, the switch circuit 122 has its switches $22_1$ to $22_n$ connected to the a-side in some frame, and signals are successively applied from the output terminals of the n stages of the shift register 121 to the gate of each of the N channel FETs 23A1 to 23An to turn them on. Accordingly, the power supply Vy+ is supplied as a scanning pulse Py to the row electrodes y1, y2, . . . , yn of the panel 101 successively from one to another. The switch circuit 122 has its switches $22_1$ to $22_n$ connected to the b-side in the next frame, and signals are successively applied from the output terminals of the n stages of the shift register 121 to the gate of each of the N channel FETs 23B1 to 23Bn to turn them on. Accordingly, the power supply Vy− is supplied as a scanning pulse Py to the row electrodes y1, y2, . . . , yn of the panel 101 successively from one to another.

In the column coordinate detection mode, the timing generator 104 applies an enable signal "0, 0" or "0, 1" (y enable in FIG. 4C) to the switch circuit 122 to connect the switches $22_1$ to $22_n$ to the c-side. Accordingly, the supply voltages Vy+, Vy− as the scanning pulses Py are not applied to the row electrodes y1, y2, . . . , yn of the panel 101.

A shift register 131 includes stages by the number corresponding to the number of the column electrodes x1, x2, . . . , xm of the panel 101. A latch circuit 132 includes stages by the number corresponding to the number of the column electrodes. A switch circuit 133 includes switches (for example, analog switches) $32_1$ to $32_m$ by the number corresponding to the number of the column electrodes. A gate circuit 134 includes N channel FETs 34A1 to 34Am and N channel FETs 34B1 to 34Bm by the number corresponding to the column electrodes. The column electrode driver 103 is composed of the shift register 131, latch circuit 132, switch circuit 133 and gate circuit 134.

Each of output terminals of m stages of the shift register 131 is connected to a movable terminal of each of the switches $33_1$ to $33_m$ of the switch circuit 113 through the latch circuit 132. A fixed terminal on the a-side of each of the switches 33 to $33_m$ is connected to a gate of each of the N channel FETs 34A1 to 34Am of the gate circuit 134, while a fixed terminal on the b-side is connected to a gate of each of the N channel FETs 34B1 to 34Bm of the gate circuit 134. Each of the N channel FETs 34A1 to 34Am has its drain connected to a power supply Vx+ (+30 V), while each of the N channel FETs 34B1 to 34Bm has its source connected to a power supply Vx− (−30 V). Each of the N channel FETs 34A1 to 34Am has its source connected to a drain of each of the N channel FETs 34B1 to 34Bm, and the junctions of those transistors are connected to the column electrodes x1, x2, ..., xm of the panel 101.

In this case, in the display mode and the row coordinate detection mode, the timing generator 104 applies an enable signal(x enable as G in FIG. 4) to the switch circuit 133 to connect the switches $33_1$ to $33_m$ to the b-side or a-side every single frame. The timing generator 104 transfers the display data SD (x data as E and K in FIG. 4) to the shift register 131, and applies a clock (x clock as F and L in FIG. 4) to the shift register 131. Each time the m display data SD included in a single scanning line are set to m stages register of the shift register 131, the timing generator 104 applies a load signal (x load as H and J in FIG. 4) to the latch circuit 132.

As a result, the switch circuit 133 has its switches $33_1$ to $33_m$ connected to the b-side in some frame, and signals are applied to respective gates of the N channel FETs 34B1 to 34Bm corresponding to the display data SD from m stages output terminals of the shift register 131 every single scanning line simultaneously to turn them on, so that the power supply Vx− is applied as the voltage VD to the specific column electrodes x1, x2, ... xm corresponding to the display data SD on the panel 101 simultaneously. In the next frame, the switch circuit 133 has its switches $33_1$ to $33_m$ connected to the a-side, and a signals are applied to respective gates of the N channel FETs 34A1 to 34Am corresponding to the display data SD from the m stages output terminals of the shift register 131 every single scanning line simultaneously to turn them on, so that the power supply Vx+ is applied as the voltage VD to the specific column electrodes x1, x2, ..., xm corresponding to the display data SD on the panel 101 simultaneously.

In the column coordinate detection mode, the timing generator 104 applies an enable signal (x enable as G in FIG. 4) to the switch circuit 133 to connect the switches $33_1$ to $33_m$ to the a-side or b-side every single frame. The timing generator 104 also transfers data for the scanning pulse Px (x data as E in FIG. 4) to the shift register 131, and applies a clock (x clock as F in FIG. 4) to the shift register 131. The timing generator 104 continuously applies a load signal (x load as H in FIG. 4) to the latch circuit 132, and this results in the through mode operation.

Thus, the switch circuit 133 has its switches $33_1$ to $33_m$ connected to the b-side in some frame, and signals are successively applied from respective output terminals of the m stages of the shift register 131 to the gate of each of the N channel FETs 34B1 to 34Bm to turn them on. Accordingly, the power supply Vx− is supplied as a scanning pulse Px to the column electrodes x1 x2, ..., xm of the panel 101 successively from one to another. The switch circuit 133 has its switches $33_1$ to $33_m$ connected to the a-side in the next frame, and signals are successively applied from respective output terminals of the m stages of the shift register 131 to the gate of each of the N channel FETs 34A1 to 34Am to turn them on. Accordingly, the power supply Vx+ is supplied as a scanning pulse Px to the column electrodes x1, x2, ..., xm of the panel 101 successively from one to another.

Thus, in the display mode, the scanning pulse Py is applied to the row electrodes y1, y2, ..., yn successively every single electrode, and the voltage VD corresponding to the display data SD is applied to the column electrodes x1, x2, ..., xm every single scanning line simultaneously. Consequently, the display operation is performed through sequential scanning to display an image corresponding to the display data SD.

A scanning pulse detected by the pen 105 is applied as a count stop signal to the coordinate y detecting circuit 107 and coordinate x detecting circuit 108 both of which are counters, through the amplifier 106. The coordinate y detecting circuit 107 receives the same clock as that applied to the shift register 121 (y clock as B and J in FIG. 4) from the timing generator 104, and also receives a reset signal (y reset in as D in FIG. 4) to be reset before it proceeds to the row coordinate detection mode. The coordinate y detecting circuit 107 begins to count the clock as it turns to the row coordinate detection mode, and stops counting when the pen 105 detects the scanning pulse Py, so that the coordinate y detecting circuit 107 counts the value corresponding to an arbitrary position on the panel 101 which the pen 105 touches, so as to present it as an output of the row coordinate. The coordinate x detecting circuit 108 receives the same clock as that applied to the shift register 131 (x clock as F in FIG. 4) from the timing generator 104, and also receives a reset signal (x reset as I in FIG. 4) to be reset before it proceeds to the column coordinate detection mode. The coordinate x detecting circuit 108 begins to count the clock as it turns to the column coordinate detection mode, and stops counting when the pen 105 detects the scanning pulse Px, so that the coordinate x detecting circuit 108 counts the value corresponding to an arbitrary position on the panel 101 which the pen 105 touches, so as to present it as an output of the column coordinate.

In FIG. 3, reference numeral 104a designates a RAM in which the display data SD is stored.

In this embodiment, since the panel 101 is used for both display and coordinate detection, the display screen of the display and the input screen of the tablet is assuredly the same in all parts with an accuracy of a single display pixel. Therefore, a process step of making the display screen of the display and the input screen of the tablet the same and the labor to perform the process can be eliminated, and the manufacturing process is simplified. Further, the panel 101 is used in both the display mode and the coordinate detection mode and the row electrode driver 102 and the column electrode driver 103 are commonly used. Thus, since a superfluous circuit is not provided, the manufacturing cost and the space can be advantageously reduced.

In the example shown in FIG. 1, the row coordinate detection mode coincides with the column coordinate detection mode. On detecting the scanning pulse Py with the pen 105, various signals required for display as well as the scanning pulse Py are detected as disturbing signals. As a result, there arises the possibility that the coordinate detection is disturbed because the scanning pulse Py is lost among the disturbing signals.

Figure 5:
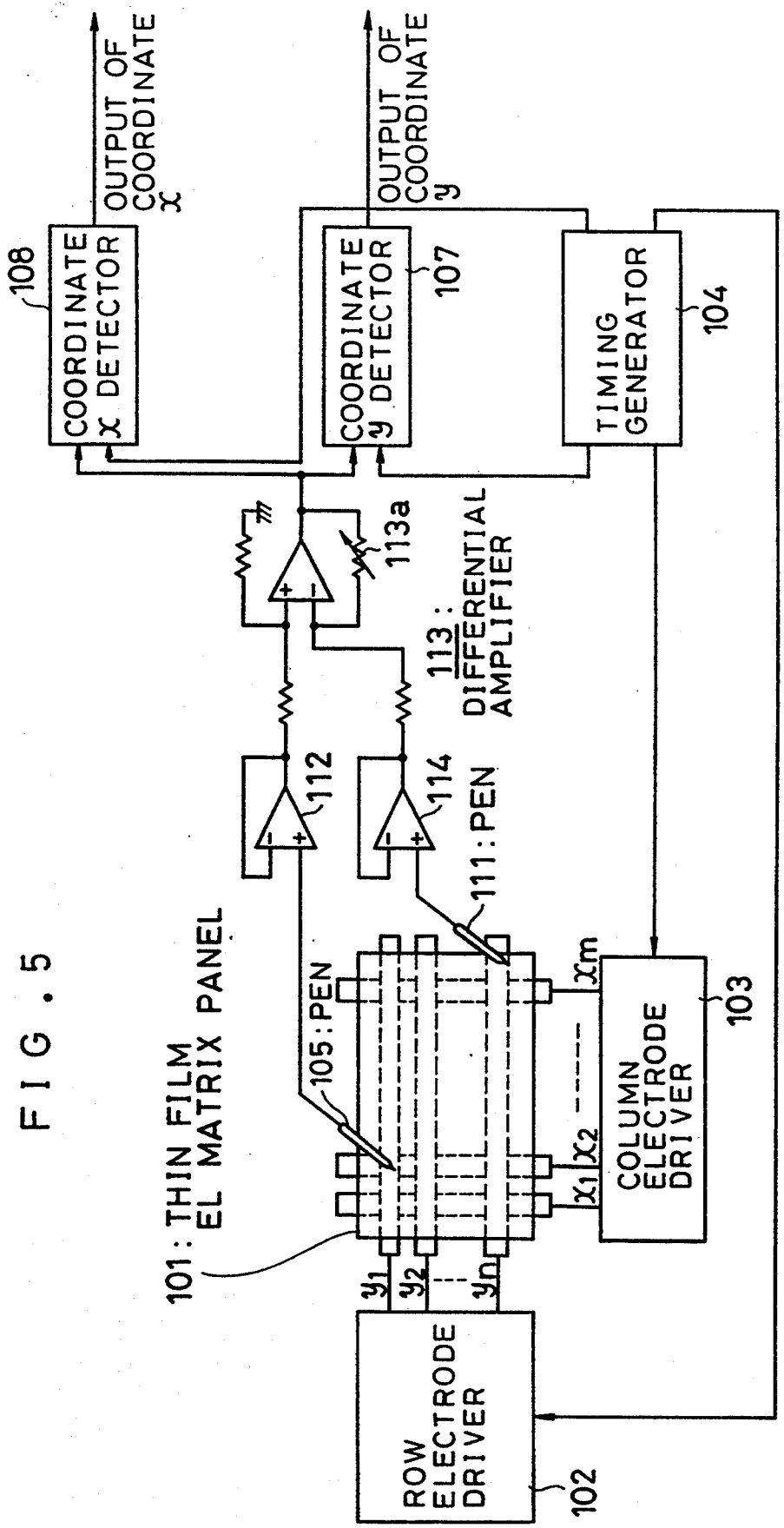
FIG. 5 is a diagram showing a constitution of another embodiment of the present invention.

To eliminate the adverse effect of the disturbing signals, another example is presented in FIG. 5. In FIG. 5 and FIG. 1, like reference numerals denote corresponding parts, and the detailed explanation about these parts is omitted.

In this example, a disturbing signal canceling pen 111 is used as well as the scanning pulse detecting pen 105. The pen 105 touches an arbitrary position on the panel 101 to produce an output signal. The output signal of the pen 105 is applied to a non-inverting input terminal of a differential amplifier 113 through a buffer amplifier 112. The pen 111 touches a position having no effect on display, namely, a lower face of the panel 101, and an output signal is applied to a inverting input terminal of the differential amplifier 113 through the buffer amplifier 114. An output signal of the differential amplifier 113 is applied to the coordinate y detecting circuit 107 and coordinate x detecting circuit 108.

In this case, in the row coordinate detection mode, the pen 105 detects the disturbing signals caused by various signals required for display as well as the scanning pulse Py while the pen 111 detects the disturbing signals compressing various signals required for display, so that the relative amount of various disturbing signals included in the signal outputted from the differential amplifier 113 is reduced. A feedback resistance 113a of the differential amplifier 113 serves as a variable resistance for unifying the level of disturbing signals detected with the pen 105 and the pen 111 to regulate the level of the disturbing signals included in the output signal of the differential amplifier 113 to the minimum.

According to the example shown in FIG. 5, in the row coordinate detection mode, the disturbing signals in the output signal of the differential amplifier 113 are reduced, and the scanning pulse Py is detected well. Thus, the coordinate can be detected well with least effect of the disturbing signals.

Figure 18:
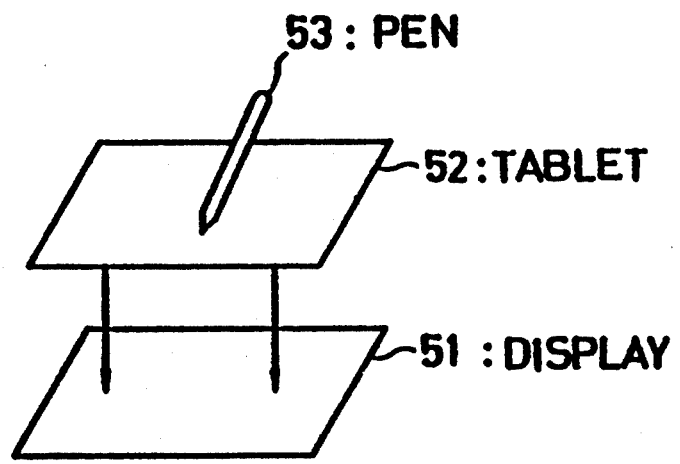
FIG. 18 is a diagram showing a constitution of a prior art embodiment.

The method of reducing the disturbing signals caused by various signals required for display with two pens 105, 111 can be applied to the conventional example shown in FIG. 18 having the display 51 and tablet 52 individually manufactured and attached to each other into a unity.

Another embodiment of the present invention will be described with reference to FIG. 6. In this embodiment, a thin film EL matrix panel is used, and both a period of the display mode and a period of the coordinate detection mode are arranged with timesharing and alternately.

Figure 6:
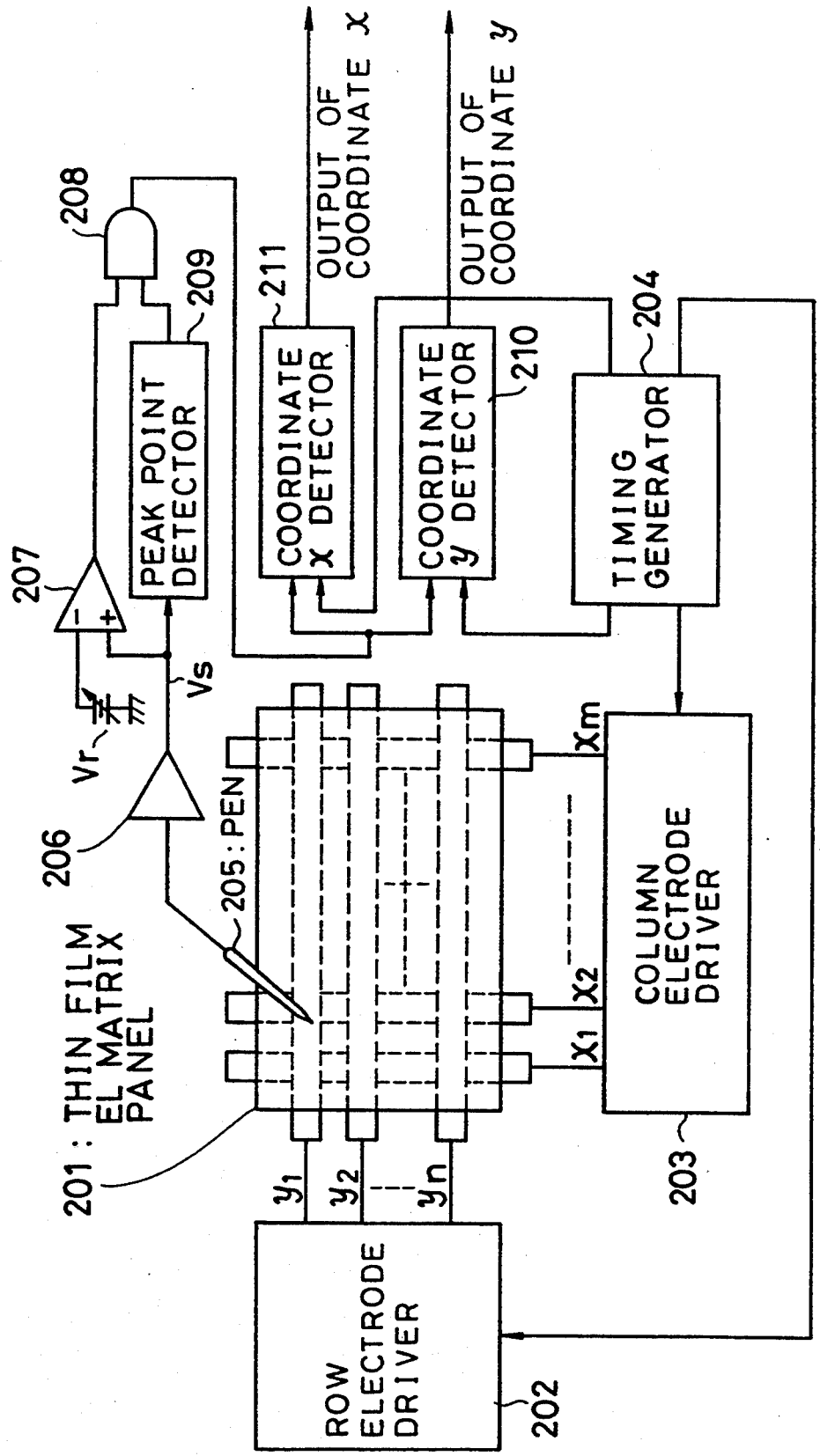
FIG. 6 is a diagram showing a constitution of still another embodiment of the present invention.

The embodiment in FIG. 6 includes a thin film EL matrix panel 201 having row electrodes y1, y2, ..., yn and column electrodes x1, x2, ..., xm.

A row electrode driver 202 has a plurality of output terminals connected to row electrodes y1, y2, ..., yn of the panel 201, respectively. A column electrode driver 203 has a plurality of output terminals connected to column electrodes x1, x2, ..., xm of the panel 201, respectively.

The operation of each of the row electrode driver 202 and the column electrode driver 203 is controlled by a timing generator 204.

Figure 7:
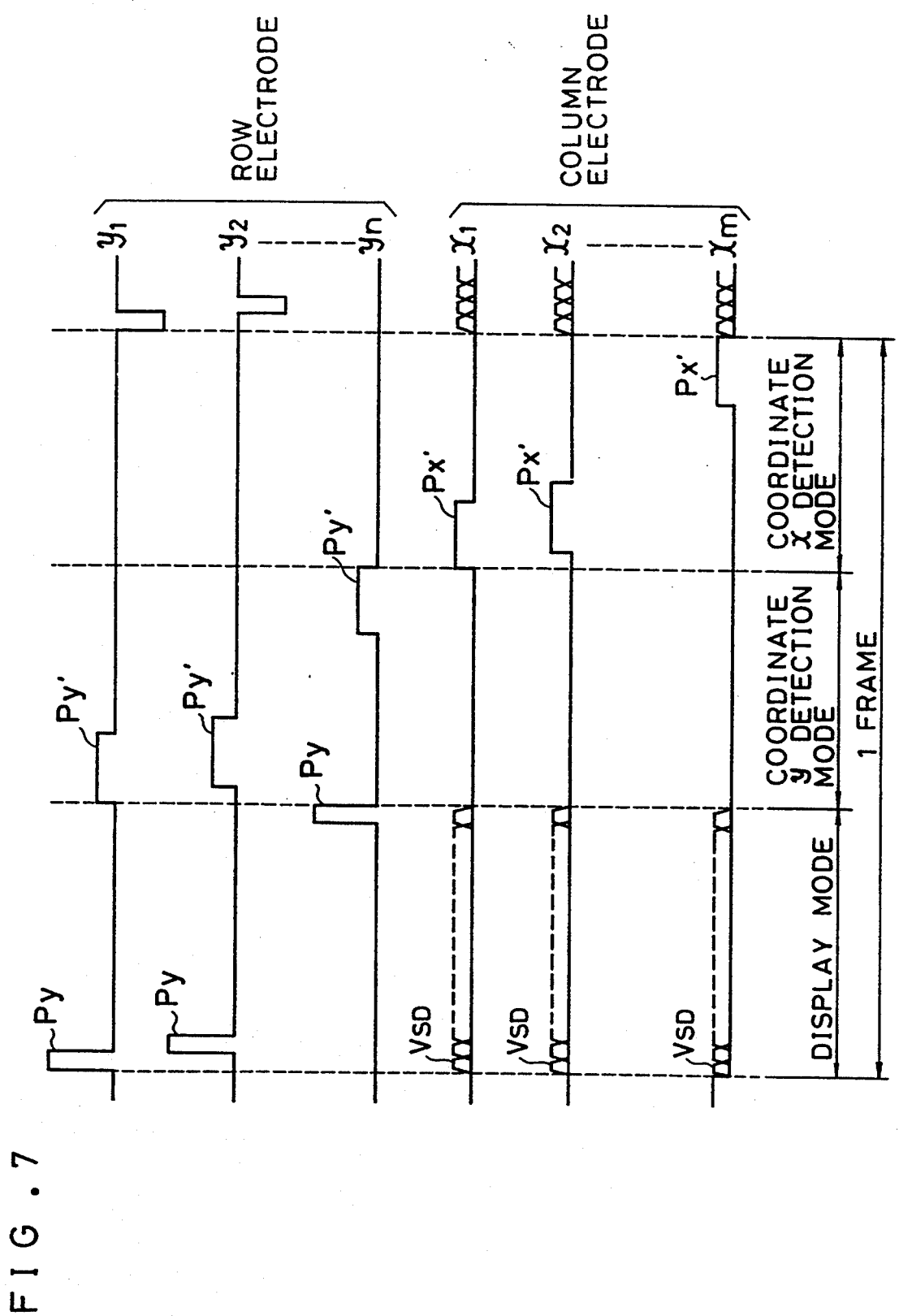
FIGS. 7 to 11 are diagrams presented for explaining the operation of the embodiment in FIG. 6.

As shown in FIG. 7, in the display mode, the row electrode driver 202 applies a scanning pulse Py to the row electrodes y1, y2, ..., yn successively every single electrode while the column electrode driver 203 applies a voltage VSD corresponding to display data SD to the column electrodes x1, x2, ..., xm every single scanning line simultaneously.

In the row coordinate (coordinate y) detection mode, the row electrode driver 202 applies a scanning pulse Py' to each of the row electrodes y1, y2, ..., yn successively. In this case, the scanning pulse Py' has a large pulse width, and the Py' pulse is being simultaneously applied to each of a plurality of electrodes (e.g. twenty electrodes) adjacent to each other in the row electrodes y1, y2, ..., yn, whereby the row electrodes y1, y2, ..., yn are successively scanned.

In the column coordinate (x coordinate) detection mode, the column electrode driver 203 applies a scanning pulse Px' to each of the column electrodes x1, x2, ..., xm successively. In this case, the scanning pulse Px' has a large pulse width, and the Px' pulse is simultaneously applied to each of a plurality of electrodes (e.g. twenty electrodes) adjacent to each other in the column electrodes x1, x2, ..., xm, whereby the column electrodes x1, x2, ..., xm are successively scanned.

During the display mode, a period of the row coordinate detection mode and a period of the column coordinate detection mode are arranged with timesharing in each frame. The order of this arrangement is not limited to the example shown in FIG. 7.

The polarity of the scanning pulse Py is inverted every single frame in the display mode. The polarity of each of the scanning pulses Py' and Px' in the coordinate detection modes also are desirably inverted every single frame, and those pulses may be of single polarity to simplify the circuit. In this case, voltage is preferably low, but the scanning pulses Py', Px' can not be detected with fine SIN ratio if the voltage is too low.

For example, in the display mode, while a light emitting threshold voltage is ±200 V, +215 V or −165 V is selectively applied to the row electrodes y1, y2, ..., yn as a scanning pulse Py, +50 V or 0 V is selectively applied to the column electrodes x1, x2, ..., xm as the voltage VSD, ±215 V to a light emitting pixel portion and ±165 V to a non-light emitting pixel portion are applied with polarity inverted alternately one frame after another. In the row coordinate detection mode, +25 V is applied to the row electrodes y1, y2, ..., yn as the scanning pulse Py'. In the column coordinate detection mode, +25 V is applied to the column electrodes x1, x2, ..., xm as the scanning pulse Px'.

With the aforementioned constitution, in the display mode, the scanning pulse Py is applied to the row electrodes y1, y2, ..., yn successively every single electrode while the voltage VSD corresponding to the display data SD is applied to the column electrodes x1, x2, ..., xm every single scanning line simultaneously, so that the display is performed through sequential scanning. In this way, an image corresponding to the display data SD is displayed.

A pencil-shaped conductor (referred to as "pen" herein after) touches an arbitrary position on the panel 201 to detect a scanning pulse through electrostatic capacity coupling.

Figure 8:
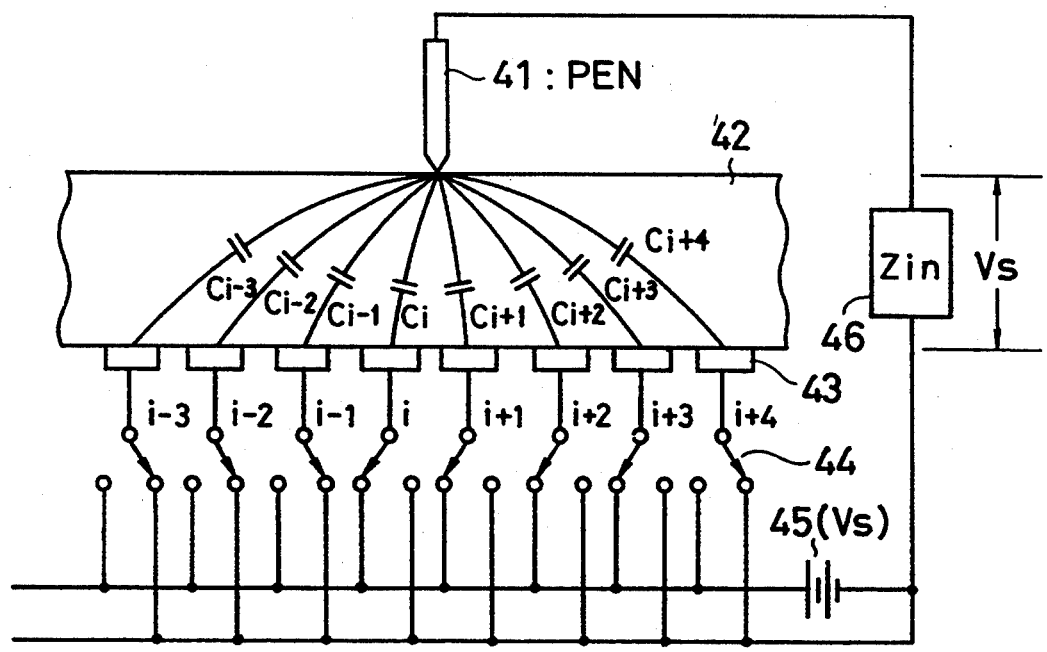

As stated above, in the coordinate detection mode, since a plurality of electrodes adjacent to each other are successively scanned while the scanning pulses Py', Px' are being applied simultaneously to those electrodes, the level of a signal detected with the pen 205 is increased compared with the case where the scanning pulses Py', Px' are applied to a single electrode alone. With reference to FIG. 8, this will be described in detail.

The example shown in FIG. 8 includes a pencil-shaped conductor 41 (referred to as "pen" hereinafter), a glass plate of a thin film EL matrix panel 42 and matrix electrodes 43. Each of the matrix electrodes 43 is substantially formed of 2 layers of row and column electrodes, but a single layer is shown to simplify the explanation. The example further includes a changeover switch 44 used for scanning, a power source 45 for generating a scanning pulse and an input impedance 46 of an amplifier (an amplifier 206 in FIG. 6) used for detecting the scanning pulse.

A capacitor is positioned between the pen 41 and the electrode 43 as shown in the figure, and its capacity is symbolized by Ci corresponding to the numeral "i" of an electrode. The electrode 43 is grounded when $j \leq i-1$ or $j \geq i+4$ and connected to the power source 45 when $i \leq j \leq i+3$. There are n of the electrodes 43, and $1 \leq j \leq n$.

Figure 9:
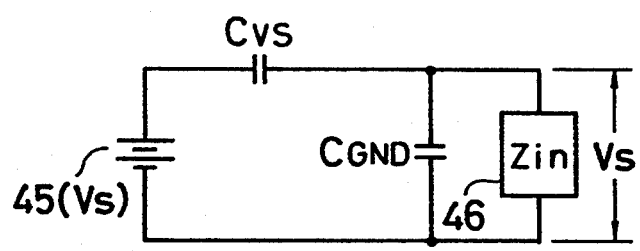

FIG. 9 shows an equivalent circuit under the condition as stated above. With regard to the circuit, formulae are given as follows:

$$C\ VS = C_i + (C_{i+1}) + (C_{i+2}) + (C_{i+3})$$

$$C\ GND = C_1 + C_2 + \ldots + (C_{i+1}) + (C_{i+4}) + \ldots + C_n$$

When $|Zin| >> 1/(\omega C\ GND)$ where $|Zin|$ indicates the magnitude of the input impedance 46 is satisfied, a signal vs detected with the pen 41 is determined as follows;

$$vs = \frac{1/(j\omega\ C\ GND + 1/Z\ in)}{1/j\omega\ C\ VS + 1/(j\omega\ C\ GND + 1/Z\ in)}\ VS \quad (1)$$

$$= \frac{C\ VS}{C\ VS + C\ GND}\ VS$$

$$= -\frac{C\ VS}{Co}\ VS$$

where VS is a voltage value of the power source 45, Co is a whole capacity produced between the pen 41 and the electrode 43 and equals $C\ VS + C\ GND$.

As will be recognized from the equation (1), in the way where voltage from the power source 45 is applied to the electrodes every single electrode, when n is several hundreds, $C\ VS << Co$ and the detected signal vs is small, so that the detection of the scanning pulse becomes difficult. However, when the number of the electrodes 43 to which voltage is simultaneously applied from the power source 45 is increased, C VS is accordingly increased and the detected signal vs is accordingly increased, so that the detection of the scanning pulse becomes easier.

Figure 10:
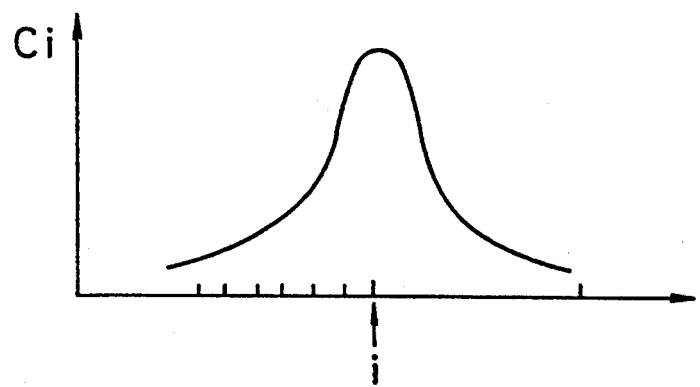

The capacity Ci of the capacitor produced by the electrode 43 becomes smaller as the distance from the pen 41 becomes larger as shown in FIG. 10. When the pitch of the electrode is 0.3 mm and the thickness of the glass is 2.4 mm, such phenomenon can be ignored in an area farther than ten electrodes on each of the left and right sides of the pen. Accordingly, twenty of the electrodes 43 to which voltage is simultaneously applied are enough, and even if more electrodes are provided, it can not be expected to increase the level of the detected signal.

Figure 11:
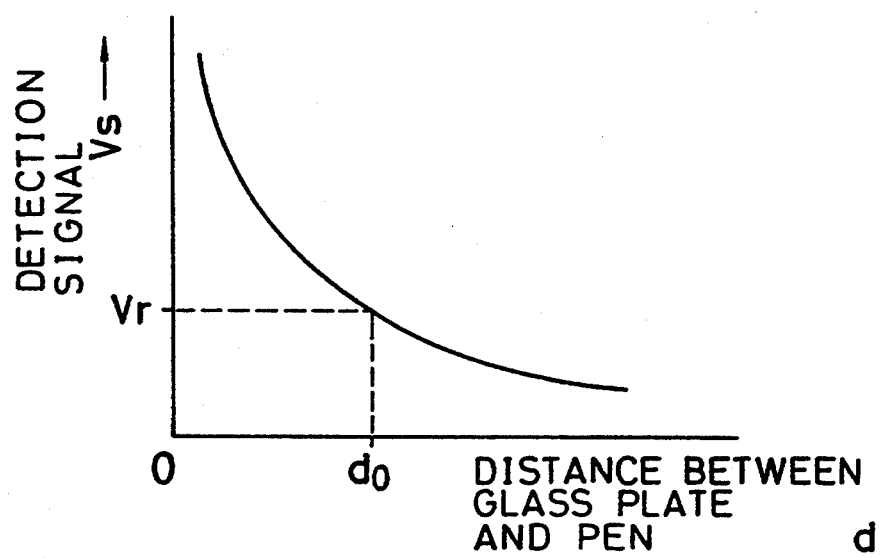

In FIG. 6, the signal detected with the pen 205 is applied to the amplifier 206 and amplified therein. The detected signal vs outputted from the amplifier 206 is applied to the comparator 207 and compared with the reference voltage Vr. The voltage vs which is detected with the pen 205, applied to and outputted from the amplifier 206 is reduced almost in inverse proportion to the distance d between the pen 205 and the glass plate as shown in FIG. 11. The reference voltage Vr is determined so as to equal the level of the detected signal vs when the distance d is do. As stated hereinafter, the distance do is a position from which the coordinate is detected, which is determined as 1 mm, for example, allowing for the operability. When the pen 205 is on the glass (the thickness of the glass is 2.4 mm), namely, d=2.4 mm, the detected signal vs is 3 V, and when d=4 mm, the detected signal vs is 1 V. Therefore, when Vr=2 V, d0=3.4 mm, and the distance from the surface of the glass plate is 1 mm.

The comparator 207 outputs a signal of the high level "1" when the detected signal vs is larger than the reference voltage Vr. When the detected signal vs is smaller than the reference voltage Vr, the comparator 207 outputs a signal of the low level "0". The output signal of the comparator 207 is applied to an AND circuit 208.

The detected signal vs from the amplifier 206 is applied to a peak point detecting circuit 209, and the peak point detecting circuit 209 outputs a signal of the high level "1" at the peak point of the detected signal vs, or outputs a signal of the low level "0" when the detected signal vs is not at its peak. The peak point detecting circuit 209 outputs a signal to the AND circuit 208.

The AND circuit 208 outputs a signal of the high level "1" when the detected signal vs is larger than the reference voltage Vr and the detected signal vs is at its peak, and otherwise the AND circuit 208 outputs a signal of the low "0". The output signal of the AND circuit 208 is applied to each of the coordinate y detecting circuit 210 and the coordinate x detecting circuit 211. In this case, the coordinate y detecting circuit 210 may be a counter, for example. The coordinate y detecting circuit 210 is reset by a reset signal which is applied by the timing generator 204 before the row coordinate detection mode is initiated. The coordinate y detecting circuit 210 receives a clock signal in the timing that the scanning pulse Py' is applied to each of the row electrodes y1, y2, . . . , yn of the panel 201 successively, counts the clock signal, and stops counting in the timing that the output signal of the AND circuit 208 turns to the high level "1". Thus, the coordinate y detecting circuit 210 outputs a count value corresponding to an arbitrary position of the panel 201 to which the pen 205 touches to present the row coordinate.

The coordinate x detecting circuit 211 may also be a counter, and is reset by a reset signal which is applied by the timing generator 204 before the column coordinate detection mode is initiated. The coordinate x detecting circuit 211 receives a clock signal in the timing that the scanning pulse Px' is applied to each of the column electrodes x1, x2, . . . , xm of the panel 201 successively, counts the clock signal, and stops counting in the timing that the output signal of the AND circuit 208 turns to the high level "1". Thus, the coordinate x detecting circuit 211 outputs a count value corresponding to an arbitrary position of the panel 201 to which the pen 205 touches to present the column coordinate.

Figure 12:
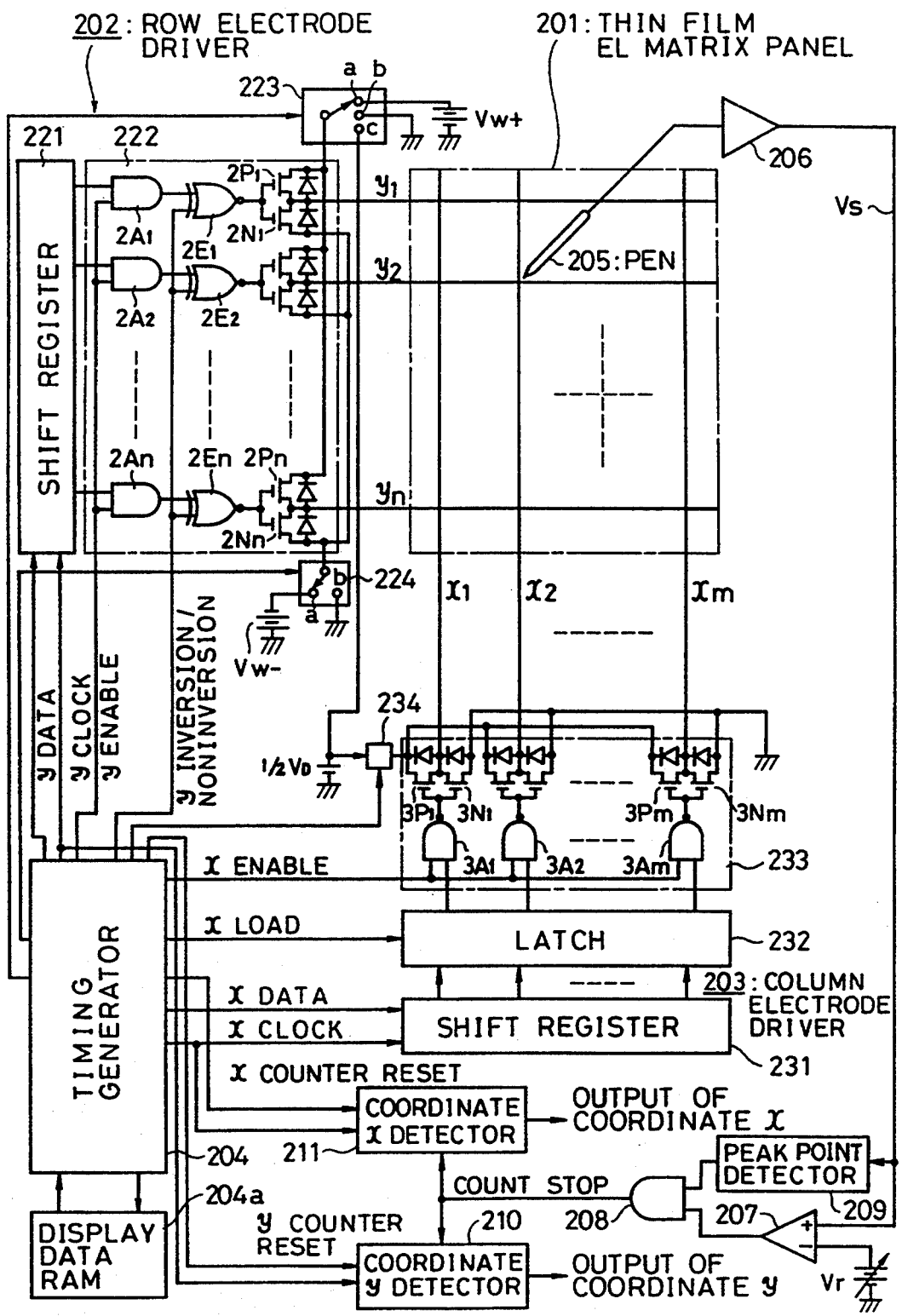
FIG. 12 is a diagram showing in detail a system constitution of the embodiment in FIG. 6.

FIG. 12 is a diagram showing a specific constitution of the example in FIG. 6. In FIG. 12 and FIG. 6, like reference numerals denote corresponding parts.

The example in FIG. 12 includes a shift register 221 having stages by the number corresponding to that of the row electrodes y1, y2, ..., yn of the panel 201, a driver 222 having AND circuits 2A1 to 2An, exclusive NOR circuits 2E1 to 2En, N channel FETs 2N1 to 2Nn and P channel FETs 2P1 to 2Pn corresponding to the number of its electrodes, a changeover switch 223 for changing over a power supply Vw+ (+215 V), ground (0 V) and a power supply ½ VD (+25 V, and a changeover switch 224 for changing over a power supply Vw− (−165 V) and ground (0 V). The row electrode driver 202 is composed of the shift register 221, the driver 222 and the changeover switches 223, 224.

Specifically, the shift register 221 has its n stages output terminals connected to an input of each of the AND circuits 2A1 to 2An of the driver 222, an output of each of the AND circuits 2A1 to 2An is connected to an input of each of the exclusive NOR circuits 2E1 to 2En, and an output of each of the exclusive NOR circuits 2E1 to 2En is connected to a gate of each of the N channel FETs 2N1 to 2Nn and to a gate of each of the P channel FETs 2P1 to 2Pn.

Each of the P channel FETs 2P1 to 2Pn has its source connected to a movable terminal of the changeover switch 223, a fixed terminal on the a-side of the changeover switch 223 is connected to the power supply Vw+, a fixed terminal on the b-side of the changeover switch 223 is grounded, and a fixed terminal on the c-side of the changeover switch 223 is connected to the power supply ½ VD. The timing generator 204 controls the changeover switch 223.

Each of the N channel FETs 2N1 to 2Nn has its source connected to a movable terminal of the changeover switch 224. A fixed terminal on the a-side of the changeover switch 224 is connected to the power supply Vw−, and a fixed terminal on the b-side is grounded. The timing generator 204 controls the changeover switch 224.

Each of the N channel FETs 2N1 to 2Nn has its drain connected to a drain of each of the P channel FETs 2P1 to 2Pn, the junctions of the drains are connected to the row electrodes y1, y2, ..., yn of the panel 201, respectively. A diode is connected between the source and drain of each of the N channel FETs 2N1 to 2Nn and each of the P channel FETs 2P1 to 2Pn.

In this case, in the display mode, the timing generator 204 applies an enable signal (y enable as C and Q in FIG. 13) to each of the AND circuit 2A1 to 2An. In some frame, the changeover switch 223 is connected to the fixed terminal on the a-side to apply the power supply Vw+ to the source of each of the P channel FETs 2P1 to 2Pn (shown as E in FIG. 13), the changeover switch 224 is connected to the fixed terminal on the b-side, the source of each of the N channel FETs 2N1 to 2Nn is grounded (shown as F in FIG. 13), and a inverting/non-inverting control signal (y inverting/non-inverting as D in FIG. 13) applied to each of the exclusive NOR circuits 2E1 to 2En turns to the low level "0". In the next frame, the changeover switch 223 is connected to the fixed terminal on the b-side, the source of each of the P channel FETs 2P1 to 2Pn is grounded (shown as E in FIG. 13), the changeover switch 224 is connected to the terminal on the a-side, the source of each of the N channel FETs 2N1 to 2Nn is connected to the power supply Vw− (shown as F in FIG. 13), and the inverting/non-inverting control signal turns to the high level "1".

The timing generator 204 applies data used as a scanning pulse Py (y data as A in FIG. 3) and a clock signal (y clock as B and N in FIG. 13) to the shift register 221. The data used as the scanning pulse Py is so programmed that the scanning pulse Py is held at the high level "1" for one clock to scan the row electrodes y1, y2, ..., yn one by one successively.

Accordingly, in some frame, a signal of the low level "0" is applied to the gate of each of the P channel FETs 2P1 to 2Pn successively to turn them on, so that the power supply Vw+ is applied to each of the row electrodes y1, y2, ..., yn of the panel 201 successively one electrode after another as the scanning pulse Py. In the next frame, a signal of the high level "1" is applied to the gate of each of the N channel FETs 2N1 to 2Nn successively to turn them on, so that the power supply Vw− is applied to each of the row electrodes y1, y2, ..., yn of the panel 201 successively one electrode after another as the scanning pulse Py.

In the row coordinate detection mode, the timing generator 204 applies an enable signal (y enable as C in FIG. 13) to each of the AND circuit 2A1 to 2An. The changeover switch 223 is connected to the fixed terminal on the c-side to apply the power supply ½ VD to the source of each of the P channel FETs 2P1 to 2Pn (shown as E in FIG. 13), the changeover switch 224 is connected to the fixed terminal on the b-side, the source of each of the N channel FETs 2N1 to 2Nn is grounded (shown as F in FIG. 13), and a inverting/non-inverting control signal (inverting/non-inverting as D in FIG. 13) applied to each of the exclusive NOR circuits 2E1 to 2En turns to the low level "0".

The timing generator 204 applies data used as a scanning pulse Py′ (y data as A in FIG. 13) and a clock signal (y clock as B in FIG. 13) to the shift register 221. The data used as the scanning pulse Py′ is so programmed that the scanning pulse Py′ is held at the high level "1" for twenty clocks to scan a plurality of adjacent electrodes (twenty electrodes) of the row electrodes y1, y2, ..., yn simultaneously.

Accordingly, a signal of the low level "0" is simultaneously applied to each of twenty adjacent gates of the gates of the P channel FETs 2P1 to 2Pn to turns them on. The power supply ½ VD as the scanning pulse Py′ is simultaneously applied to each of twenty adjacent electrodes of the row electrodes y1, y2, ..., yn of the panel 201, and each of the electrodes are scanned.

In the column coordinate detection mode, an enable signal (y enable as C in FIG. 13) applied to each of the AND circuit 2A1 to 2An from the timing generator 204 is turned to the low level "0". The changeover switch 223 is connected to the fixed terminal on the b-side, the source of each of the P channel FETs 2P1 to 2Pn is grounded (shown as E in FIG. 13), the changeover switch 224 is connected to the fixed terminal on the b-side, the source of each of the N channel FETs 2N1 to 2Nn is grounded (shown as F in FIG. 13), the inverting/non-inverting signal turns to the low level "0". Accordingly, a signal of the high level "1" is applied to the gate of each of the N channel FETs 2N1 to 2Nn to turn them on, so that all the row electrodes y1, y2, ..., yn of the panel 201 are grounded.

Further, the example in FIG. 12 includes a shift register 231 having stages by the number corresponding to that of the column electrodes x1, x2, ..., xm of the panel 201, a latch circuit 232 having stages corresponding to the column electrodes x1, x2, ..., xm, a driver 233 having NAND circuits 3A1 to 3Am, N channel FETs 3N1 to 3Nm and P channel FETs 3P1 to 3Pm corresponding to the column electrodes x1, x2, ..., xm, and a variable power circuit 234. The column electrode driver 203 is composed of the shift register 231, the latch circuit 232, the driver 233 and the variable power circuit 234.

The shift register 231 has its m stages output terminals connected to input terminals of the NAND circuits 3A1 to 3Am of the driver 233 through the latch circuit 232, respectively, an output of each of the NAND circuits 3A1 to 3Am is connected to a gate of each of the N channel FETs 3N1 to 3Nm and to a gate of each of the P channel FETs 3P1 to 3Pm.

Each of the P channel FETs 3P1 to 3Pm has its source connected to an output of the variable power circuit 234, and an input of the variable power circuit 234 is connected to the power supply ½ VD. The variable power circuit 234 is controlled by the timing generator 204, and the variable power circuit 234 outputs VD in the display mode while it outputs ½ VD in the coordinate detection mode (shown as K in FIG. 13). Each of the N channel FETs 3N1 to 3Nm has its source grounded.

Each of the P channel FETs 3P1 to 3Pm has its drain connected to a drain of each of the N channel FETs 3N1 to 3Nm, and the junctions of the drains are connected to the column electrodes x1, x2, . . . , xm of the panel 201, respectively. A diode is connected between the drain and source of each of the N channel FETs 3N1 to 2Nm and each of the P channel FETs 3P1 to 3Pm. In this case, in the display mode, the timing generator 204 applies an enable signal (x enable as J and Q in FIG. 13) to each of the NAND circuits 3A1 to 3Am.

The timing generator 204 transfers data (x data as H and Q in FIG. 13) to the shift register 231, and applies a clock signal (x clock as I and P in FIG. 13) to the shift register 231. In some frame where the power supply Vw+ is applied to the row electrodes y1, y2, . . . , yn as the scanning pulse Py, data which is the inverted display data SD is applied to the shift register 223. On the other hand, in the next frame where the power supply Vw− is applied to the row electrodes y1, y2, . . . , yn as the scanning pulse Py, the display data SD is applied without being inverted.

While the data are successively transferred to the shift register 231, each time m data corresponding to a single scanning line are accumulated in the shift register 231, the timing generator 204 applies a load signal (x load as L and N in FIG. 13) to the latch circuit 232. At that time, the latch circuit 232 latches the m data and hold them for a period that m data corresponding to the next single scanning line are accumulated successively. In this way, a period sufficient for light emission of EL, about 40 μsec, for example, is secured.

Accordingly, in a frame where the power supply Vw+ is applied to the row electrodes y1, y2, . . . , yn as the scanning pulse Py, a signal of the high level "1" is applied to the gate of any transistor related to a pixel serving display in the N channel FETs 3N1 to 3Nm every single scanning line to turn the transistor on, while a signal of low level "0" is applied to the gate of any transistor related to a pixel not serving display in the P channel FETs 3P1 to 3Pm to turn the transistor on, so that any electrode related to the pixel serving display in the column electrodes x1, x2, . . . , xm of the panel 201 is grounded while voltage VD is applied to any electrode related to the pixel not serving display.

Meanwhile, in the next frame where the power supply Vw+ is applied as the scanning pulse Py, a signal of the low level "0" is applied to the gate of any transistor related to a pixel serving display in the P channel FETs 3P1 to 3Pm every single scanning line to turn the transistor on, while a signal of high level "1" is applied to the gate of any transistor related to a pixel not serving display in the N channel FETs 3N1 to 3Nm to turn the transistor on, so that the voltage VD is applied to any electrode related to the pixel serving display in the column electrodes x1, x2, . . . , xm of the panel 201 while the pixel not serving dislay is grounded.

In the row coordinate detection mode, an enable signal (x enable as J in FIG. 13) applied to each of the NAND circuit 3A1 to 3Am from the timing generator 204 is turned to the low level "0". Accordingly, a signal of the high level "1" is applied to the gate of each of the N channel FETs 3N1 to 3Nm to turn them on, so that all the column electrodes x1, x2, . . . , xm of the panel 201 are grounded.

In the column coordinate detection mode, the timing generator 204 applies an enable signal (x enable as J in FIG. 13) to each of the NAND circuits 3A1 to 3Am. Also, the timing generator 204 applies data used as the scanning pulse Px' (x data as H in FIG. 13) and a clock signal (x clock as I in FIG. 13) to the shift register 231. The data used as the scanning pulse Px', in order to scan simultaneously a plurality of adjacent electrodes (e.g. twenty electrodes) of the column electrodes x1, x2, . . . , xm, are held at the high level "1" for a period of twenty clock signals. The timing generator 204 continuously applies a load signal (x load as L in FIG. 13) to the latch circuit 232, and the latch circuit 232 is kept in the through mode.

Accordingly, a signal of the low level "0" is applied to each of the twenty adjacent gates of the P channel FETs 3P1 to 3Pm simultaneously to turn them on, while the power supply ½ VD is applied to each of the twenty adjacent electrodes of the column electrodes x1, x2, . . . , xm of the panel 201 simultaneously as the scanning pulse Px', and thus the electrodes are scanned successively.

Thus, in the display mode, the scanning pulse Py is applied to each of the row electrodes y1, y2, . . . , yn successively every single electrode while the voltage corresponding to the display data SD is applied to each of the column electrodes x1, x2, . . . , xm every single scanning line simultaneously, and the display operation is performed through sequential scanning, so that an image corresponding to the display data SD is displayed.

A signal detected with the pen 205 is applied to the amplifier 206. The amplifier 206 outputs a detected signal vs to the comparator 207 and the peak point detecting circuit 209, and each of the comparator 207 and peak point detecting circuit 209 outputs a signal to the AND circuit 208. The AND circuit 208 outputs a signal of the high level "1" when the detected signal vs is larger than the reference voltage Vr and the detected signal vs is at its peak, and otherwise the AND circuit 208 outputs a signal of the low level "0".

The signal outputted from the AND circuit 208 is applied to the coordinate y detecting circuit 210 and the coordinate x detecting circuit 211 as a count stop signal.

The timing generator 204 applies the same clock signal (y clock as B in FIG. 13) as that applied to the shift register 221 to the coordinate y detecting circuit 210, and also applies a reset signal (y counter reset as G in FIG. 13) to reset the coordinate y detecting circuit 210 before the row coordinate detection mode is initiated. The coordinate x detecting circuit 210 starts counting the clock signal when the row coordinate detection mode starts, and stops counting when the detected signal vs is larger than the reference voltage Vr and the detected signal vs is at its peak, so that the coordinate y detecting circuit 210 outputs a count value corresponding to an arbitrary position of the panel 201 which the pen 205 touches to present the row coordinate.

The timing generator 204 applies the same clock signal (x clock as I in FIG. 13) as that applied to the shift register 231 to the coordinate x detecting circuit 211, and also applies a reset signal (x counter reset as M in FIG. 13) to reset the coordinate x detecting circuit 211 before the column coordinate detection mode is initiated. The coordinate x detecting circuit 211 starts counting the clock signal when the column coordinate detection mode starts, and stops counting when the detected signal vs is larger than the reference voltage Vr and the detected signal vs is at its peak, so that the coordinate x detecting circuit 211 outputs a count value corresponding to an arbitrary position of the panel 201 which the pen 205 touches to present the column coordinate.

In FIG. 12, reference numeral 204a denotes a RAM to which the display data SD is stored.

In this embodiment, since the panel 201 is used for both display and coordinate detection, the display screen on the display and the input screen is assuredly the same in all parts with an accuracy of a single display pixel. Therefore, a tablet of this embodiment can be easily manufactured.

Further, the panel 201 is used in both the display mode and the coordinate detection mode and the row electrode driver 202 and the column electrode driver 203 are commonly used. Thus, since a superfluous circuit is not provided, the manufacturing cost and the required space can be advantageously reduced.

Since a period of the display mode and a period of the coordinate detection mode are arranged with timesharing and alternately, the scanning pulses Py', Px' can be detected without influence of signals required for display but disturbing detection during the coordinate detection mode, so that coordinates can be detected well.

In the coordinate detecting mode, since the scanning pulses Py', Px' are applied to each of more than one adjacent electrodes (e.g. twenty electrodes) simultaneously and then the electrodes are successively scanned, the level of the detected signal of the pen 25 is raised, so that the scanning pulses Py', Px' can be easily detected, and coordinates can be detected well.

When the pen (pencil-shaped conductor) 205 is put close to the glass face of the panel 201, a signal outputted from the comparator 207 turns to the high level "1". Each of the coordinate y detecting circuit 210 and the coordinate x detecting circuit 211 receives a count stop signal from the AND circuit 208 to automatically start detecting coordinates. Compared with a conventional device in which the tip of a pen is pressed against the display and the mechanical switch mounted in the pen is turned on to start detecting coordinates, manipulation of the device is easy, the device can be manufactured with small number of parts at moderate costs, and having no movable member, there is no possibility of malfunction of the pen 205.

In the aforementioned embodiments, a thin film EL matrix panel is used. Now, an example in which an AC plasma display is employed will be described.

Figure 14:
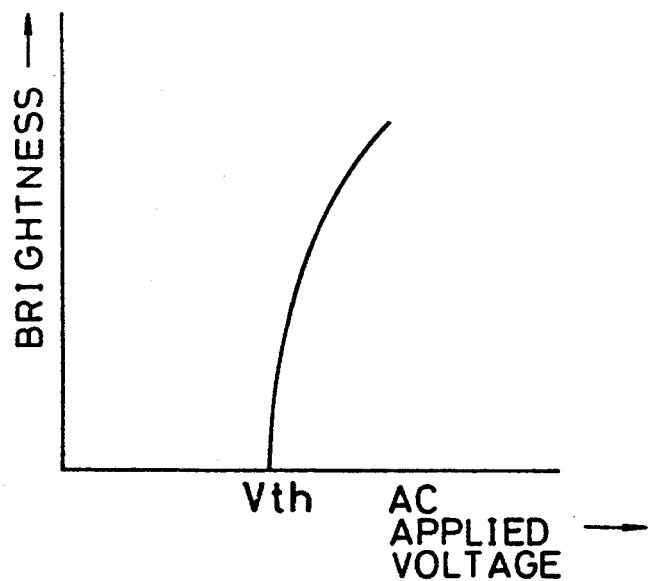
FIGS. 14 and 15 are diagrams presented for explaining an AC type plasma display.
Figure 15:
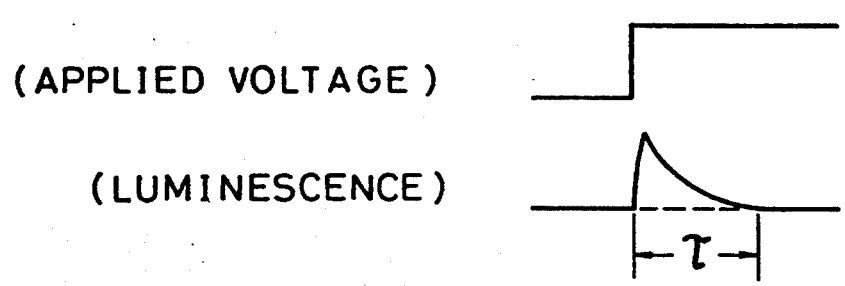

The thin film EL matrix panel and the AC plasma display have almost the same AC voltage brightness characteristics and light emitting period varying characteristics (V th is about 200 to 300 V) as shown in FIGS. 14 and 15. Accordingly, a device using the AC plasma display can be implemented with the AC plasma display substituted for the thin film EL matrix panel 201 in the example of FIG. 12.

In this case, light emission period $\tau$ in the thin film EL matrix panel is about 100 $\mu$sec, while that in the AC plasma display is shorter, about 1$\mu$. Hence the Ac plasma display is lower in brightness than the thin film EL matrix panel, when the AC voltage frequency is the same between them. To improve the brightness, the AC voltage frequency may be raised.

In other words, although merely a specific voltage is applied to a selected point on the matrix electrode during the display mode in the case where the thin film EL matrix panel 201 is used, a higher speed burst pulse may be applied to a selected point on the matrix electrode of the AC plasma display. This can be implemented by dividing the x and y enable signals in the example of FIG. 12 with shorter clock signals (shown as C', J' and Q' in FIG. 13).

Figure 13:
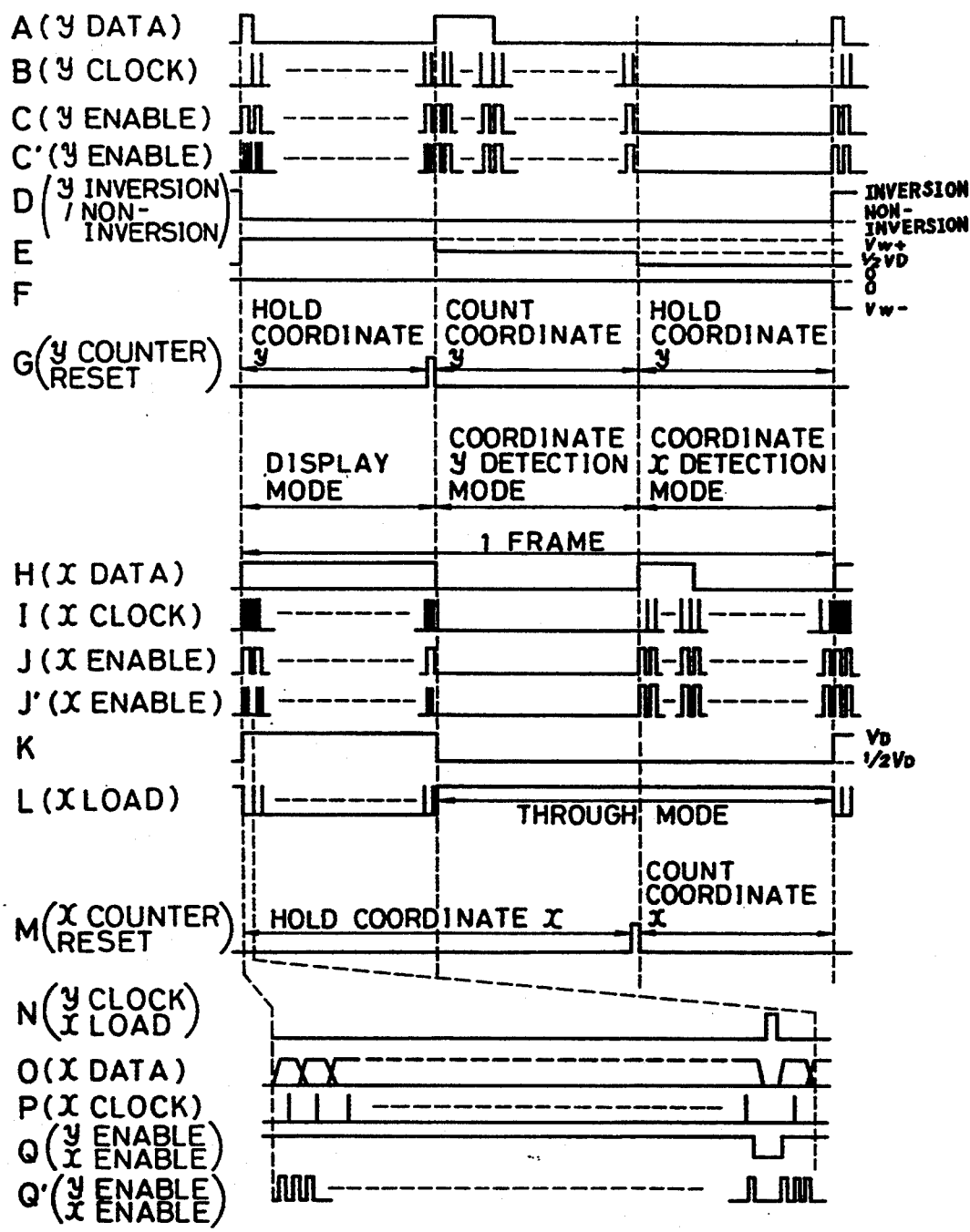
FIG. 13 is a diagram presented for explaining the operation of the system constitution in FIG. 12.

A device with the AC plasma display substituted for the thin film EL matrix panel 101 in the example of FIG. 13 can also be implemented, although the detailed explanation is omitted.

Figure 16:
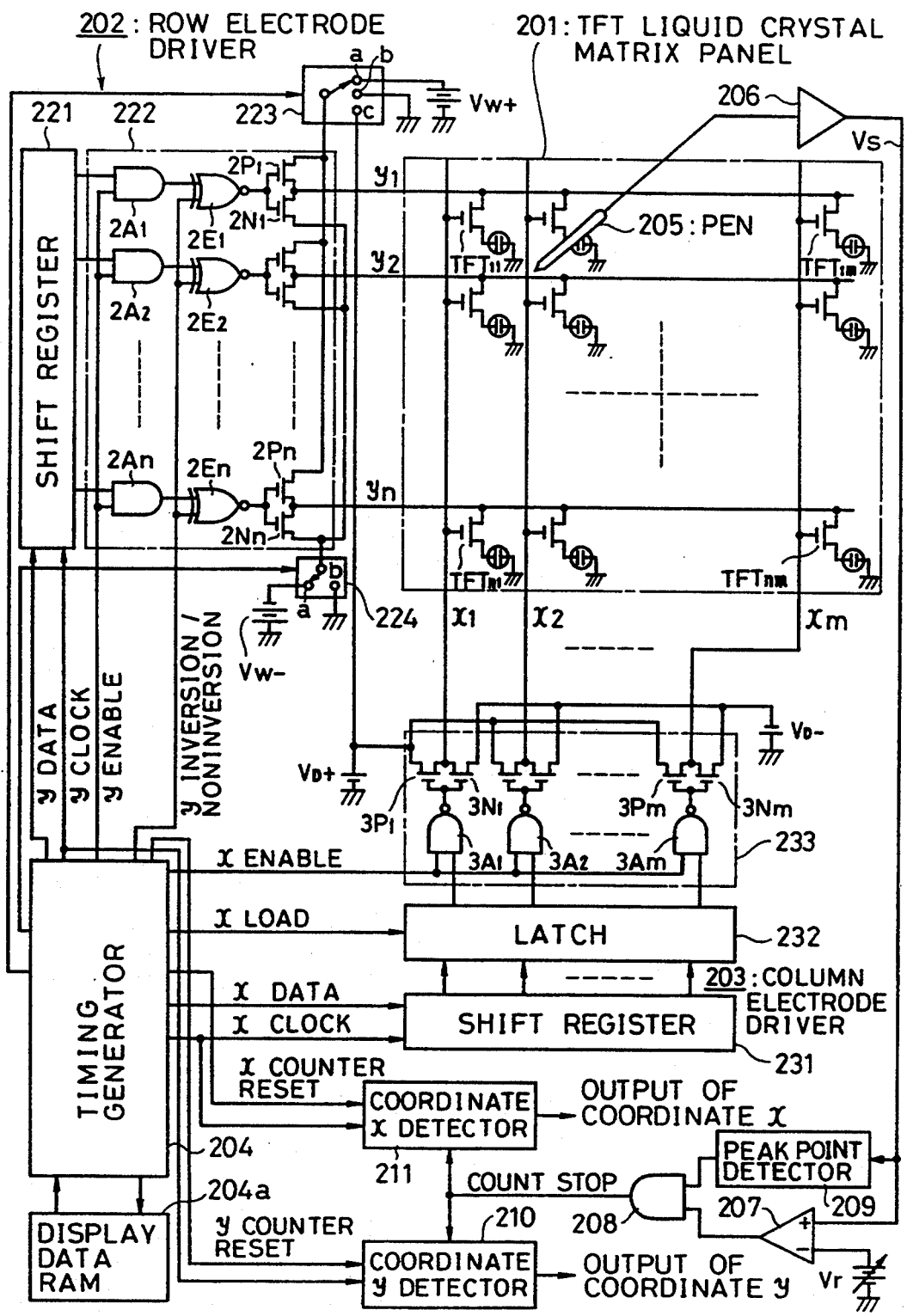
FIG. 16 is a diagram showing in detail a constitution of yet another embodiment of the present invention.

An example using a thin film transistor (TFT) liquid crystal matrix panel will now be described. In FIGS. 16 and 12, like reference numerals denote corresponding parts, and the explanation about them is omitted.

In FIG. 16, reference numeral 201' denotes a TFT liquid crystal matrix panel. Unlike the thin film EL matrix panel and the plasma display, in the TFT liquid crystal matrix panel 201', a pixel of liquid crystal is not directly connected to the matrix electrode. A TFT corresponding to a pixel is selected from the row electrodes y1 to yn and the column electrodes x1 to xm, and a voltage inverted in each frame is applied only to a specified pixel for displaying the pixel.

Each of the row electrodes y1, y2, ..., yn is connected to a source of each of TFT 11 to TFT 1m, TFT 21 to TFT 2m, ..., and TFT n1 to TFT nm, while each of the column electrodes x1, x2, ..., xm is connected to a gate of each of the TFT 11 to TFT 1m, TFT 21 to TFT 2m, ..., and TFT to TFT nm. A drain of each of the TFT 11 to TFT nm is connected to each of liquid crystal pixel electrodes. The diode between the drain and source of each of the N channel FETs 2N1 to 2Nn and each of the P channel FETs 2P1 to 2Pn is unnecessary.

The fixed terminal on the c-side of the changeover switch 223 is connected to the power supply VD+ (e.g. +15 V). The supply voltages Vw+ and Vw− are +5 V and −5 V, respectively.

Figure 17:
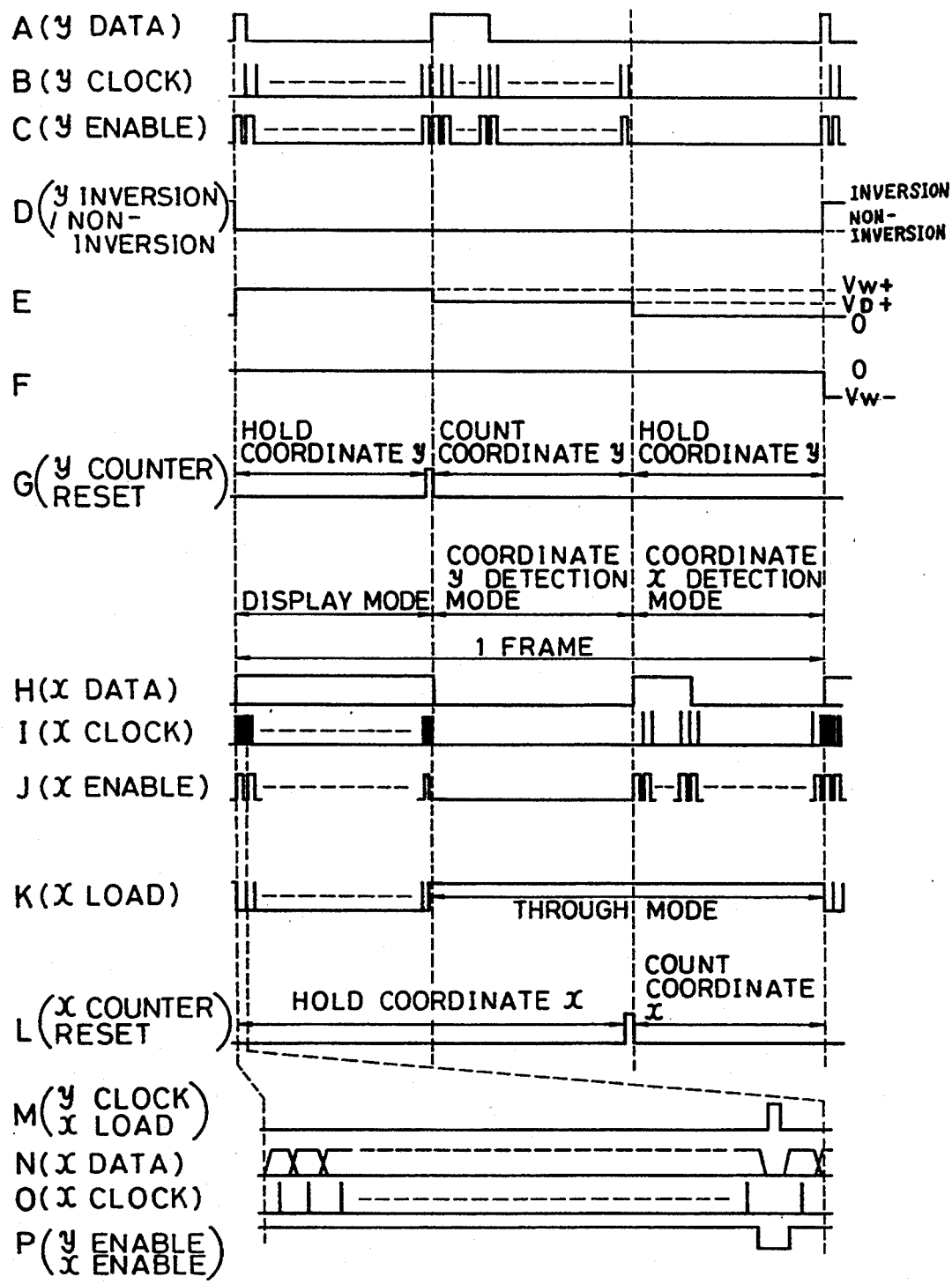
FIG. 17 is a diagram presented for explaining the operation of the embodiment in FIG. 16.

In this case, in the display mode, the timing generator 204 applies an enable signal (shown as C and P in FIG. 17) to each of the AND circuits 2A1 to 2N. In some frame, the changeover switch 223 is connected to the fixed terminal on the a-side to apply the power supply Vw+ to the source of each of the P channel FETs 2P1 to 2Pn (shown as E in FIG. 17), the changeover switch 224 is connected to the on the fixed terminal on the b-side and each of the N channel FETs 2N1 to 2Nn has its source grounded (shown as F in FIG. 17), and an inverting/non-inverting control signal (y inverting/non-inverting as D in FIG. 17) applied to each of the exclusive NOR circuits 2E1 to 2En is turned to the low level "0". In the next frame, the changeover switch 223 is connected to the fixed terminal on the b-side and each of the P channel FETs 2P1 to 2Pn has its source grounded (shown as E in FIG. 17), the changeover switch 224 is connected to the fixed terminal on the a-side, each of the N channel FETs 2n1 to 2Nn has its source connected to the power supply Vw− (shown as F in FIG. 17), and the inverting/non-inverting control signal is turned to the high level "1".

The timing generator 204 applies data used for the scanning pulse Py (y data as A in FIG. 17) and a clock signal (y clock as B and M in FIG. 17) to the shift register 221. The data used as the scanning pulse Py is kept at the high level "1" for a period corresponding to a single clock signal to scan each of the row electrodes y1, y2, . . . , yn one electrode after another successively.

In some frame, a signal of the low level "0" is successively applied to the gate of each off the P channel FETs 2P1 to 2Pn to turn them on, so that the power supply Vw+ is applied to each of the row electrodes y1, y2, . . . , yn of the panel 201' as the scanning pulse Py successively every single electrode. In the next frame, a signal of the high level "1" is successively applied to the gate of each of the N channel FETs 2N1 to 2Nn to turn them on, so that the power supply Vw− is applied to each of the row electrodes y1, y2, . . . , yn of the panel 201' as the scanning pulse Py successively every single electrode.

In the row coordinate detection mode, the timing generator 204 applies an enable signal (y enable as C in FIG. 17) to each of the AND circuits 2A1 to 2An. The changeover switch 223 is connected to the fixed terminal on the c-side to apply the power supply VD+ to the source of each of the P channel FETs 2P1 to 2Pn (shown as E in FIG. 17), the changeover switch 224 is connected to the fixed terminal on the b-side and each of the N channel FETs 2N1 to 2Nn has its source grounded (shown as F in FIG. 17), and an inverting/non-inverting control signal (inverting/non-inverting as D in FIG. 17) applied to each of the exclusive NOR circuit 2E1 to 2En is turned to the low level "0".

The timing generator 204 applies data used as the scanning pulse Py' and a clock signal (y clock as B in FIG. 17) to the shift register 221. The data used for the scanning pulse Py' is kept at the high level "1" for a period corresponding to twenty clock signals to simultaneously scan more than one adjacent electrodes (e.g. twenty electrodes) of the row electrodes y1, y2, . . . , yn.

A signal of the low level "0" is applied simultaneously to each of twenty adjacent gates of the P channel FETs 2P1 to 2Pn to turn them on, the power supply VD+ is applied simultaneously to twenty adjacent electrodes of the row electrodes y1, y2, . . . , yn as the scanning pulse Py', and then the electrodes are successively scanned.

In the column coordinate detection mode, an enable signal (y enable as C in FIG. 17) applied to each of the AND) circuits 2A1 to 2An by the timing generator 204 is turned to the low level "0". The changeover switch 223 is connected to the fixed terminal on the b-side and each of the P channel FETs 2P1 to 2Pn has its source grounded (shown as E in FIG. 17), while the changeover switch 224 is connected to the fixed terminal on the b-side and each of the N channel FETs 2N1 to 2Nn has its source grounded (shown as F in FIG. 17), and the inverting/non-inverting control signal is turned to the low level "0". As a result, a signal of the high level "1" is applied to the gate of each of the N channel FETs 2N1 to 2Nn to turn them on, so that the row electrodes y1, y2, . . . , yn of the panel 201' are all grounded.

Each of the P channel FETs 3P1 to 3Pm which are components of the driver 233 has its source connected to the power supply VD+, while each of the N channel FETs 3N1 to 3Nm has its source connected to the power supply VD− (e.g. −15 V). There is no need to provide a diode between the drain and source of each of the N channel FETs 3N1 to 3Nm and each of the P channel FETs 3P1 to 3Pm.

In this case, in the display mode, the timing generator 204 applies an enable signal (x enable as J and P in FIG. 17) to each of NAND circuits 3A1 to 3Am.

The timing generator 204 applies the display data SD (x data as H and N in FIG. 17) and a clock signal (x clock as I and O in FIG. 17) to the shift register 231.

While the data are successively transferred to the shift register 231, each time m data corresponding to a single scanning line are accumulated, the timing generator 204 applies a load signal (x load as K and M in FIG. 17) to the latch circuit 232. The latch circuit 232 latches the m data until m data corresponding to the next single scanning line are successively accumulated.

In a frame where the power supply Vw+ or Vw− is applied to the row electrodes y1, y2, . . . , yn as the scanning pulse Py, a signal of the low level "0" is applied to the gate of any transistor related to a pixel serving display in the P channel FETs 3P1 to 3Pm every single scanning line to turn the transistor on, while a signal of high level "1" is applied to the gate of any transistor related to a pixel not serving display in the N channel FETs 3N1 to 3Nm to turn the transistor on, so that voltage VD+ is applied to any electrode related to the pixel serving display in the column electrodes x1, x2, . . . , xm of the panel 201' while voltage VD− is applied to any electrode related to the pixel not serving display.

In the column coordinate detection mode, an enable signal (x enable as J in FIG. 17) applied to each of the NAND circuits 3A1 to 3Am by the timing generator 204 is turned to the low level "0". Accordingly, a signal of the high level "1" is applied to the gate of each of the N channel FETs 3N1 to 3Nm to turn them on, so that the voltage VD− is applied to all the column electrodes x1, x2, . . . , xm of the panel 201'.

In the column coordinate detection mode, the timing generator 204 applies an enable signal (x enable as J in FIG. 17) to each of the NAND circuits 3A1 to 3Am. Then, the timing generator 204 applies data used as the scanning pulse Px' (x data as H in FIG. 17) and a clock signal (x clock as I in FIG. 17) to the shift register 231. The scanning pulse Px' is kept at the high level "1" for a period corresponding to twenty clock signals to simultaneously scan more than one adjacent electrodes (e.g. twenty electrodes) of the column electrodes x1, x2, . . ., xm. The timing generator 204 continuously applies a load signal (x load as K in FIG. 17) to the latch circuit 232, and the latch circuit 232 is kept in the through mode.

Thus, a signal of the low level "0" is applied simultaneously to twenty adjacent gates of the P channel FETs 3P1 to 3Pm to turn the transistors on, the voltage VD+ is applied simultaneously to the adjacent twenty electrodes of the column electrodes x1, x2, . . . , xm as the scanning pulse Px', and then the electrodes are successively scanned.

Thus, in the display mode, the scanning pulse Py is applied to each of the row electrodes y1, y2, . . . , yn successively every single electrode, while the voltage corresponding to the display data SD is applied simultaneously to the column electrodes x1, x2, . . . , xm every single scanning line, and the display operation is performed for each of the TFT 11 to TFT nm through sequential scanning, so that an image corresponding to the display data SD is displayed.

A signal detected with the pen 205 is applied to the amplifier 206. The amplifier 206 outputs a detected signal vs to the comparator 207 and the peak point detecting circuit 209, and each of the comparator 207 and peak point detecting circuit 209 outputs a signal to the AND circuit 208. The AND circuit 208 outputs a signal of the high level "1" when the detected signal vs is larger than the reference voltage Vr and the detected signal vs is at its peak, and otherwise the AND circuit 208 outputs a signal of the low level "0".

The signal outputted from the AND circuit 208 is applied to each of the coordinate y detecting circuit 210 and coordinate x detecting circuit 211 (which include a counter, respectively) as a count stop signal.

The timing generator 204 applies the same clock signal (y clock as B in FIG. 17) as that applied to the shift register 221 to the coordinate y detecting circuit 210, and also applies a reset signal (y counter reset as G in FIG. 17) to reset the coordinate y detecting circuit 210 before the row coordinate detection mode is initiated. The coordinate y detecting circuit 210 starts counting the clock signal when the row coordinate detection mode starts, and stops counting when the detected signal vs is larger than the reference voltage Vr and the detected signal vs is at its peak, so that the coordinate y detecting circuit 210 outputs a count value corresponding to an arbitrary position of the panel 201' which the pen 205 touches to present the row coordinate.

The timing generator 204 applies the same clock signal (x clock as I in FIG. 17) as that applied to the shift register 231 to the coordinate x detecting circuit 211, and also applies a reset signal (x counter reset as L in FIG. 17) to reset the coordinate x detecting circuit 211 before the column coordinate detection mode is initiated. The coordinate x detecting circuit 211 starts counting the clock signal when the column coordinate detection mode starts, and stops counting when the detected signal vs is larger than the reference voltage Vr and the detected signal vs is at its peak, so that the coordinate x detecting circuit 211 outputs a count value corresponding to an arbitrary position of the panel 201' which the pen 205 touches to present the column coordinate.

The example has been described in conjunction with the example of FIG. 12. A device with the TFT liquid crystal matrix panel 201', substituted for the thin film EL matrix panel 101 in the example of FIG. 3, can also be implemented.

There has been described examples using a thin film EL matrix panel, an AC plasma display, and a TFT liquid crystal matrix panel. The present invention is not limited to the form disclosed herein. Various modifications and variations where a simple matrix type liquid crystal display device, a DC plasma display, or other kinds of matrix panels are employed can be applied.

As has been described, according to the present invention, since the panel is used for both display and coordinate detection, the display screen of the display and the input screen of the tablet is assuredly the same in all parts with an accuracy of a single display pixel. Therefore, the work to make both the screen the same becomes unnecessary and a tablet can be easily manufactured.

Further, the panel is used in both the display mode and the coordinate detection mode, and the row electrode driver and the column electrode driver are commonly used. Thus since a superfluous circuit is not provided, the manufacturing cost and the required space can be advantageously reduced.

Since the period of the display mode and the period of the coordinate detection mode are arranged alternately and with timesharing, the scanning pulses can be detected without influence of signals that are required for display but disturb detection during the coordinate detection mode, so that coordinates can be detected well.

What is claimed is:

1. A tablet integrated with a display comprising:
a matrix panel for display, having row and column electrodes;
a row electrode driver for applying a row scanning pulse successively to every row electrode of the matrix panel;
a column electrode driver for applying a column scanning pulse successively to every column electrode of the matrix panel and applying a voltage corresponding to display data;
a detecting conductor, which can be coupled capacitively with the row and column electrodes by contacting the matrix panel, for picking up the row and column scanning pulses from the matrix panel;
a timing generator for transferring the display data to the column electrode driver and applying timing signals, for determining timings of the row and column scanning pulses, to the row electrode driver and the column electrode driver; and
row and column coordinate detecting circuits electrically connected to the detecting conductor; wherein,
during a display mode, the row electrode driver applies the row scanning pulse successively to every row electrode of the matrix panel, and the column electrode driver applies a voltage, in accordance with the display data, simultaneously to the column electrode of the matrix panel each time the row scanning pulse is applied successively to the row electrode of the matrix panel;
during a row detection mode, the row electrode driver applies the row scanning pulse successively to the row electrodes of the matrix panel, and the row coordinate detecting circuit analyzes the timing of the row scanning pulse picked up by the detecting conductor touching an arbitrary position on the matrix panel, so as to determine the row coordinate of the position which the detecting conductor touches; and
during a column detection mode, the column electrode driver applies the column scanning pulse successively to the column electrodes of the matrix panel, and the column coordinate detecting circuit analyzes the timing of the column scanning pulse picked up by the detecting conductor touching an arbitrary position on the matrix panel, so as to determine the column coordinate of the position which the detecting conductor touches;

said tablet integrated with a display further comprising means for effecting said display mode, row detection mode, and column detection mode during alternate periods of time in a time sharing manner.

2. A tablet according to claim 1, further comprising:
signaling means for signaling when said row electrode driver starts to successively apply row scanning pulses and for signaling when said column electrode driver starts to successively apply column scanning pulses;
said row detecting circuit comprising a row counter for counting the number of row scanning pulses applied to row electrodes of the matrix panel; and
said column detecting circuit comprising a column counter for counting the number of column scanning pulses applied to the column electrodes of the matrix panel.

3. A tablet according to claim 2, further comprising:
column counter stopping means for stopping the counting by said column counter when said detecting conductor picks up a column scanning pulse from the matrix panel; and
row counter stopping means for stopping the counting by said row counter when said detecting conductor picks up the row scanning pulse from the matrix panel.

4. A tablet according to claim 1, wherein the matrix panel comprises a thin film electroluminescent matrix panel.

5. A tablet according to claim 1, wherein the matrix panel comprises a liquid crystal matrix panel.

6. A tablet according to claim 1, wherein the matrix panel comprises an AC plasma display.

7. A tablet according to claim 1, further comprising a comparator, electrically connected to the row and column coordinate detecting circuits, for comparing a signal outputted from the detecting conductor with a reference voltage, wherein each of the row and column coordinate detecting circuits starts operating when a signal outputted from the detecting conductor is greater than or equal to the reference voltage.

8. A tablet according to claims 1, further comprising a disturbing signal cancelling conductor for detecting the scanning pulse of each of the row electrodes, and a differential amplifier, outputting to each of the row and column coordinate detecting circuits, a difference signal which represents the difference between a signal outputted from the disturbing signal cancelling conductor and a signal outputted from the detecting conductor.

9. A tablet integrated with a display comprising:
a matrix display panel, having row and column electrodes;
a row electrode driver for applying a row scanning pulse to individual row electrodes of the matrix panel;
a column electrode driver for applying a column scanning pulse to individual column electrodes of the matrix panel and applying a voltage corresponding to display data to individual column electrodes;
a detecting conductor, which can be coupled capacitively with the row and column electrodes by contacting the matrix panel, for picking up the row and column scanning pulses from the matrix display panel;
a timing generator for transferring the display data to the column electrode driver and applying timing signals to the row electrode driver and the column electrode driver; and
row and column coordinate detecting circuits electrically connected to the detecting conductor; wherein,
during a display mode, the row electrode driver successively applies the row scanning pulse to individual row electrodes of the matrix panel, and the column electrode driver applies a voltage, in accordance with the display data, to the column electrodes of the matrix panel each time the row scanning pulse is applied to the row electrode of the matrix panel;
during a row detection mode, the row electrode driver successively applies the row scanning pulse to individual row electrodes of the matrix panel, and the row coordinate detecting circuit analyzes the timing of the row scanning pulse picked up by the detecting conductor touching an arbitrary position on the matrix panel, so as to determine the row coordinate of the position of the detecting conductor; and
during a column detection mode, the column electrode driver successively applies the column scanning pulse to the column electrodes of the matrix panel, and the column coordinate detecting circuit analyzes the timing of the column scanning pulse picked up by the detecting conductor touching an arbitrary position on the matrix panel, so as to determine the column coordinate of the position of the detecting conductor.

10. A tablet according to claim 9, further comprising:
signaling means for signaling when said row electrode driver starts to successively apply row scanning pulses and for signaling when said column electrode driver starts to successively apply column scanning pulses;
said row detecting circuit comprising a row counter for counting the number of row scanning pulses applied to the row electrodes of the matrix panel; and
said column detecting circuit comprising a column counter for counting the number of column scanning pulses applied to the column electrodes of the matrix panel.

11. A tablet according to claim 10, further comprising:
column counter stopping means for stopping the said counting by said column counter when said detecting conductor picks up a column scanning pulse from the matrix panel; and
row counter stopping means for stopping the counting by said row counter when said detecting conductor picks up a row scanning pulse from the matrix panel.

12. A tablet according to claim 9, wherein the matrix panel comprises a thin film electroluminescent matrix panel.

13. A tablet according to claim 9, wherein the matrix panel comprises a liquid crystal matrix panel.

14. A tablet according to claim 9, wherein the matrix panel comprises an AC plasma display.

15. A tablet according to claim 9, further comprising a comparator electrically connected to the row and column coordinate detecting circuits for comparing a signal outputted from the detecting conductor with a reference voltage, wherein each of the row and column coordinate detecting circuits starts its operating when a signal outputted from the detecting conductor is greater than or equal to the reference voltage.

16. A tablet according to claim 9, further comprising a disturbing signal cancelling conductor for detecting the scanning pulse of each of the row electrodes, and a differential amplifier, outputting to each of the row and column coordinate detecting circuits, a difference signal which represents the difference between a signal outputted from the disturbing signal cancelling conductor and a signal outputted from the detecting conductor.

17. A tablet integrated with a display comprising:
- a matrix panel for display, having row and column electrodes;
- a row electrode driver for applying a row scanning pulse successively to every row electrode of the matrix panel;
- a column electrode driver for applying a column scanning pulse successively to every column electrode of the matrix panel and applying a voltage corresponding to display data;
- a detecting conductor, which can be coupled capacitively with the row and column electrodes by contacting the matrix panel, for picking up the row and column scanning pulses from the matrix panel;
- a timing generator for transferring the display data to the column electrode driver and applying timing signals for determining timings of the row and column scanning pulses to the row electrode driver and the column electrode driver; and
- row and column coordinate detecting circuits electrically connected to the detecting conductor;
- the row electrode driver comprising means for applying, during a display mode, the row scanning pulse successively to every row electrode of the matrix panel, and means for applying a voltage, in accordance with the display data, simultaneously to the column electrode of the matrix panel each time the row scanning pulse is applied successively to the row electrodes of the matrix panel;
- the row electrode driver comprising means for applying, during a row detection mode, the row scanning pulse successively to the row electrodes of the matrix panel, and means for analyzing the timing of the row scanning pulse picked up by the detecting conductor touching an arbitrary position on the matrix panel, so as to determine the row coordinate of the position which the detecting conductor touches;
- the column electrode comprising means for applying, during a column detection mode, the column scanning pulse successively to the column electrodes of the matrix panel, and means for analyzing the timing of the column scanning pulse picked up by the detecting conductor touching an arbitrary position on the matrix panel, so as to determine the column coordinate of the position which the detecting conductor touches;
- said tablet integrated with a display further comprising means for effecting said display mode, row detection mode, and column detection mode during alternate periods of time in a time sharing manner.

18. A tablet integrated with a display comprising:
- a matrix display panel, having row and column electrodes;
- a row electrode driver for applying a row scanning pulse to individual row electrodes of the matrix panel;
- a column electrode driver for applying a column scanning pulse to individual column electrodes of the matrix panel and applying a voltage corresponding to display data to individual column electrodes;
- a detecting conductor, which can be coupled capacitively with the row and column electrodes by contacting the matrix panel, for picking up the row and column scanning pulses from the matrix display panel;
- a timing generator for transferring the display data to the column electrode driver and applying timing signals to the row electrode driver and the column electrode driver; and
- row and column coordinate detecting circuits electrically connected to the detecting conductor;
- the row electrode driver comprising means for successively applying, during a display mode, the row scanning pulse to individual row electrodes of the matrix panel, and means for applying a voltage, in accordance with the display data, to the column electrodes of the matrix panel each time the row scanning pulse is applied to the row electrodes of the matrix panel;
- the row electrode driver comprising means for successively applying, during a row detection mode, the row scanning pulse to individual row electrodes of the matrix panel, and means for analyzing the timing of the row scanning pulse picked up by the detecting conductor touching an arbitrary position on the matrix panel, so as to determine the row coordinate of the position of the detecting conductor; and
- the column electrode driver comprising means for successively applying, during a column detection mode, the column scanning pulse to the column electrodes of the matrix panel, and means for analyzing the timing of the column scanning pulse picked up by the detecting conductor touching an arbitrary position on the matrix panel, so as to determine the column coordinate of the position of the detecting conductor.

19. A tablet according to claim 9, further comprising a peak point detector electrically connected to the row and column coordinate detecting circuits for detecting a peak point of a signal output from the detecting conductor, wherein each of the row and column coordinate detecting circuits starts operating when the peak point detector detects the peak point.

20. A tablet according to claim 17, further comprising a peak point detector electrically connected to the row and column coordinate detecting circuits for detecting a peak point of a signal output from the detecting conductor, wherein each of the row and column coordinate detecting circuits starts operating when the peak point detector detects the peak point.

* * * * *